US009147058B2

(12) United States Patent  
Casey et al.

(10) Patent No.: US 9,147,058 B2  
(45) Date of Patent: Sep. 29, 2015

(54) GESTURE ENTRY TECHNIQUES

(71) Applicant: APPLE INC., Cupertino, CA (US)

(72) Inventors: Brandon J. Casey, San Jose, CA (US);
Jake M. Logan, Palo Alto, CA (US);
Erik M. Cressall, San Jose, CA (US);
Stephen H. Cotterill, Redwood City, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 13/651,100

(22) Filed: Oct. 12, 2012

(65) Prior Publication Data

US 2014/0109018 A1    Apr. 17, 2014

(51) Int. Cl.  
*G06F 3/048*    (2013.01)  
*G06F 21/32*    (2013.01)  
*G06F 3/0489*   (2013.01)  
*G06F 3/0488*   (2013.01)  
*G06F 21/36*    (2013.01)

(52) U.S. Cl.  
CPC ............ *G06F 21/32* (2013.01); *G06F 3/04883* (2013.01); *G06F 3/04895* (2013.01); *G06F 21/36* (2013.01)

(58) Field of Classification Search  
None  
See application file for complete search history.

(56) References Cited

U.S. PATENT DOCUMENTS

| | | | |
|---|---|---|---|
| 5,559,961 A * | 9/1996 | Blonder | 726/18 |
| 7,800,592 B2 | 9/2010 | Kerr et al. | |
| 8,539,550 B1 * | 9/2013 | Terres et al. | 726/2 |
| 8,584,031 B2 | 11/2013 | Moore et al. | |
| 8,627,235 B2 * | 1/2014 | Chang et al. | 715/863 |
| 8,756,511 B2 * | 6/2014 | Heo et al. | 715/741 |
| 8,806,612 B2 * | 8/2014 | Kao | 726/17 |
| 2003/0103653 A1 * | 6/2003 | Avni et al. | 382/119 |
| 2004/0106445 A1 | 6/2004 | Perrie et al. | |
| 2005/0253817 A1 | 11/2005 | Rytivaara et al. | |
| 2006/0155746 A1 | 7/2006 | Abrams et al. | |
| 2007/0234889 A1 | 10/2007 | Rotolo de Moraes | |
| 2008/0163130 A1 * | 7/2008 | Westerman | 715/863 |
| 2008/0178126 A1 * | 7/2008 | Beeck et al. | 715/863 |
| 2009/0284482 A1 * | 11/2009 | Chin | 345/173 |

(Continued)

OTHER PUBLICATIONS

Droid X by Motorola User Guide, "Security Through Pretty Pictures: The Unlock Pattern," Apr. 7, 2011, 72 pages.

(Continued)

*Primary Examiner* — Matt Kim  
*Assistant Examiner* — Maryam Ipakchi  
(74) *Attorney, Agent, or Firm* — Morgan, Lewis & Bockius LLP

(57) ABSTRACT

Techniques are provided for entering, verifying, and saving a gesture on a touch-sensitive display device. In one embodiment, the device displays a gesture entry screen where a user enters a gesture. The device estimates the entered gesture and displays the estimated gesture on a gesture replay screen. The estimated gesture may be replayed repeatedly until stopped, and the device may display a gesture verification screen where the user may reenter the gesture. The device verifies if the re-entered gesture is substantially the same as the original estimated gesture. Some embodiments include a visible trace following a user's touch on the touch-sensitive display, where the trace may change in color and/or length depending on the speed, duration, and/or complexity of an entered gesture. Some embodiments include display indicator(s) (e.g., a strength bar, color change, timer, etc.) to indicate the strength and/or elapsed time during an entry or replay of a gesture.

33 Claims, 15 Drawing Sheets

(56) References Cited

U.S. PATENT DOCUMENTS

| | | | |
|---|---|---|---|
| 2009/0289916 A1* | 11/2009 | Dai | 345/173 |
| 2009/0303231 A1* | 12/2009 | Robinet et al. | 345/419 |
| 2009/0313693 A1* | 12/2009 | Rogers | 726/21 |
| 2010/0132043 A1* | 5/2010 | Bjorn et al. | 726/25 |
| 2010/0134431 A1 | 6/2010 | Tsai et al. | |
| 2010/0235726 A1 | 9/2010 | Ording et al. | |
| 2010/0257448 A1 | 10/2010 | Squires | |
| 2010/0262905 A1* | 10/2010 | Li | 715/702 |
| 2011/0041102 A1 | 2/2011 | Kim | |
| 2011/0050583 A1 | 3/2011 | Tho | |
| 2011/0066984 A1* | 3/2011 | Li | 715/863 |
| 2011/0070864 A1* | 3/2011 | Karam et al. | 455/411 |
| 2011/0154268 A1* | 6/2011 | Trent et al. | 715/863 |
| 2011/0156867 A1* | 6/2011 | Carrizo et al. | 340/5.85 |
| 2011/0187497 A1* | 8/2011 | Chin | 340/5.54 |
| 2011/0283241 A1* | 11/2011 | Miller et al. | 715/863 |
| 2011/0300831 A1* | 12/2011 | Chin | 455/411 |
| 2012/0060128 A1* | 3/2012 | Miller et al. | 715/863 |
| 2012/0066650 A1* | 3/2012 | Tirpak et al. | 715/863 |
| 2012/0133484 A1* | 5/2012 | Griffin | 340/5.54 |
| 2012/0146927 A1* | 6/2012 | Chang et al. | 345/173 |
| 2012/0204258 A1* | 8/2012 | Lee | 726/19 |
| 2012/0246483 A1* | 9/2012 | Raisch | 713/178 |
| 2012/0252410 A1* | 10/2012 | Williams | 455/411 |
| 2012/0304098 A1* | 11/2012 | Kuulusa | 715/772 |
| 2012/0304284 A1 | 11/2012 | Johnson et al. | |
| 2013/0267250 A1 | 10/2013 | Lin et al. | |
| 2014/0085241 A1 | 3/2014 | Christiansson et al. | |
| 2014/0109010 A1* | 4/2014 | Casey et al. | 715/835 |

OTHER PUBLICATIONS

Office Action, dated Apr. 24, 2014, received in received in U.S. Appl. No. 13/651,118, 13 pages.

Final Office Action, dated Oct. 31, 2014, received in U.S. Appl. No. 13/651,118, 15 pages.

Office Action, dated May 27, 2015, received in U.S. Appl. No. 13/651,118, 16 pages.

* cited by examiner

GESTURE ENTRY TECHNIQUES

BACKGROUND

The present disclosure relates generally to electronic devices, and more specifically to techniques for entering authentication gestures into electronic devices.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

The present disclosure relates generally to controlling access to information or applications stored on an electronic device, such as a handheld or portable device. This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices, and in particular portable electronic devices (e.g., portable media players, cellular telephones and notebook and tablet computers) are increasingly used for storing various types of information. Such information may include confidential information such as phone numbers, personal and professional contacts, electronic communications, information relating to finances or financial accounts, business related projects and documents, personal photos and videos, personal and business contacts, and so forth. Storing such information on a portable electronic device allows a user to access the information wherever the user may take the device. However, storing such information on a portable electronic device may also increase the risk that confidential information may be lost, stolen, or accessed by an unauthorized person.

Some electronic devices are configured with security measures to decrease accessibility of confidential information to unauthorized parties. However, conventional security measures such as the use of alphanumeric security codes (e.g., passwords, personal identification numbers [PINs], etc.) may not provide adequate security. In particular, screens or fields for entering a password or PIN may be visible to a bystander who may be able to view the entered security code. Furthermore, users may select a password or PIN which may be guessed relatively easily and may not provide a high degree of security for the stored confidential information.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present embodiments relate to the use of security measures based on non-alphanumeric inputs that are user configurable (as opposed to purely biometric inputs) to control access to restricted information or functions. For example, access to confidential information may be based on a gesture input via a touch sensitive input device, such as a touch sensitive display or touchpad. A gesture may be used to invoke one or more authentication screens, such as, a gesture entry screen, a gesture replay screen, and a gesture re-entry verification screen, for accessing confidential information or functions that may be otherwise unavailable.

In certain embodiments of the present disclosure, an authentication gesture entry screen is displayed to allow a user to enter a desired gesture via an array of visible and/or invisible touch sensing areas displayed on a touch sensitive display. To enter or input the authentication gesture, the user travels a path along the touch sensing areas using one or more fingers until achieving a desired gesture. A gesture replay screen is then displayed to allow the user to repeatedly view an estimate of the gesture initially entered by the user on the gesture entry screen until the user decides to stop the repeated replays. A gesture verification screen is subsequently displayed to allow the user to re-enter the initially entered and viewed gesture via a similar array of visible and/or invisible touch sensing areas displayed on the touch sensitive display. If the re-entered gesture is substantially the same as the gesture entered and viewed on the gesture entry and gesture replay screens, respectively, then the verified gesture is saved for the purpose of user authentication and/or authorization.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
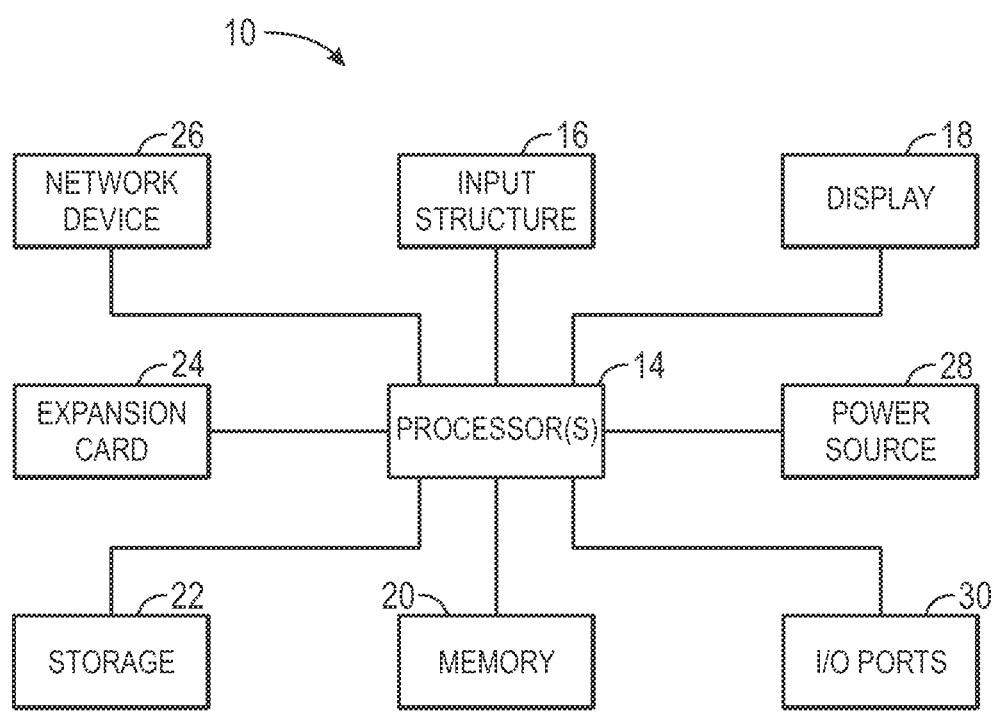
FIG. 1 is a block diagram of an example of components of an electronic device, in accordance with present embodiments.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present techniques allow for securely accessing confidential and/or hidden information or functions stored on an electronic device. Examples of such information and functions may include bank account or credit card information (as well as other types of financial information), personal contacts, personal photos, applications that allow or invoke confidential information, and networks or similar communication options that may be accessible via an electronic device. The information or functions may be accessed using non-alphanumeric (e.g., characters or elements not found on a keyboard), and non-biometric inputs that are user configurable, such as gestures or sequence codes. In certain embodiments, an initial screen may not display any reference to the existence of the confidential data or functions or any visible selection related to accessing such data or function. The presently disclosed techniques allow a user to enter, view, verify, and save an authentication gesture to restrict access to such confidential data or functions. Once the authentication gesture is saved, the confidential data and/or functions can be accessed only if subsequent entries of an authentication gesture are substantially the same as the saved authentication gesture.

In one embodiment, a gesture entry screen is displayed to allow a user to enter a desired gesture via an array of visible and/or invisible touch sensing areas displayed on a touch-sensitive display. To enter or input the authentication gesture, the user travels a path along the touch sensing areas using one or more fingers until achieving a desired gesture. A gesture replay screen is then displayed to allow the user to repeatedly view an estimate of the gesture initially entered by the user on the first gesture entry screen until the user decides to stop the repeated replays. A gesture verification screen is subsequently displayed to allow the user to re-enter the initially entered and viewed gesture via a similar array of visible and/or invisible touch sensing areas displayed on the touch sensitive display. The user then saves the just entered, viewed, and, verified gesture to restrict access to confidential data and/or functions. Once the gesture is saved, the confidential data and/or functions can be accessed only if a subsequent entry of a gesture is substantially the same as the saved authentication gesture.

Figure 2:
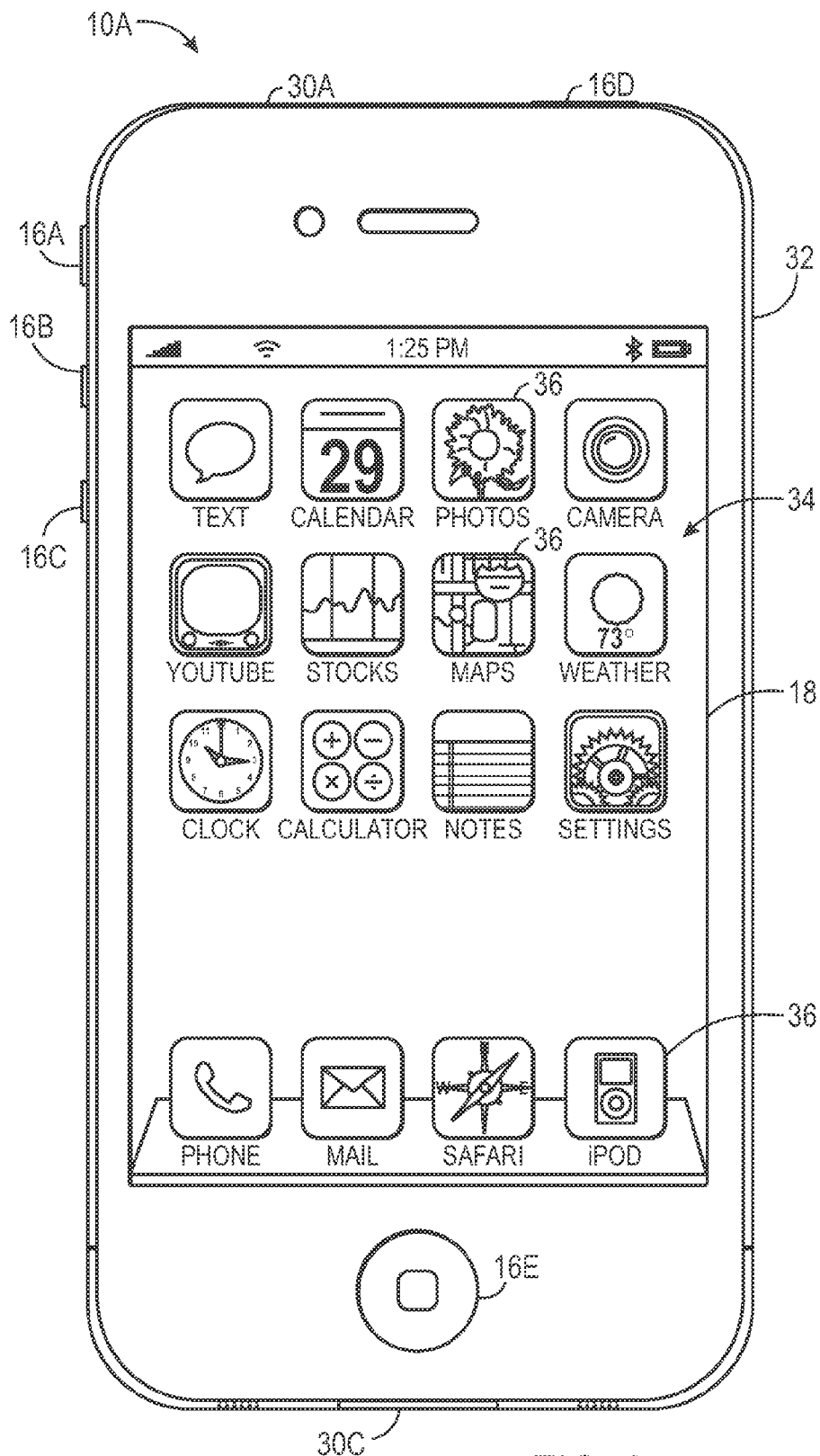
FIG. 2 is a front view of a handheld electronic device embodiment in accordance with present embodiments.
Figure 3:
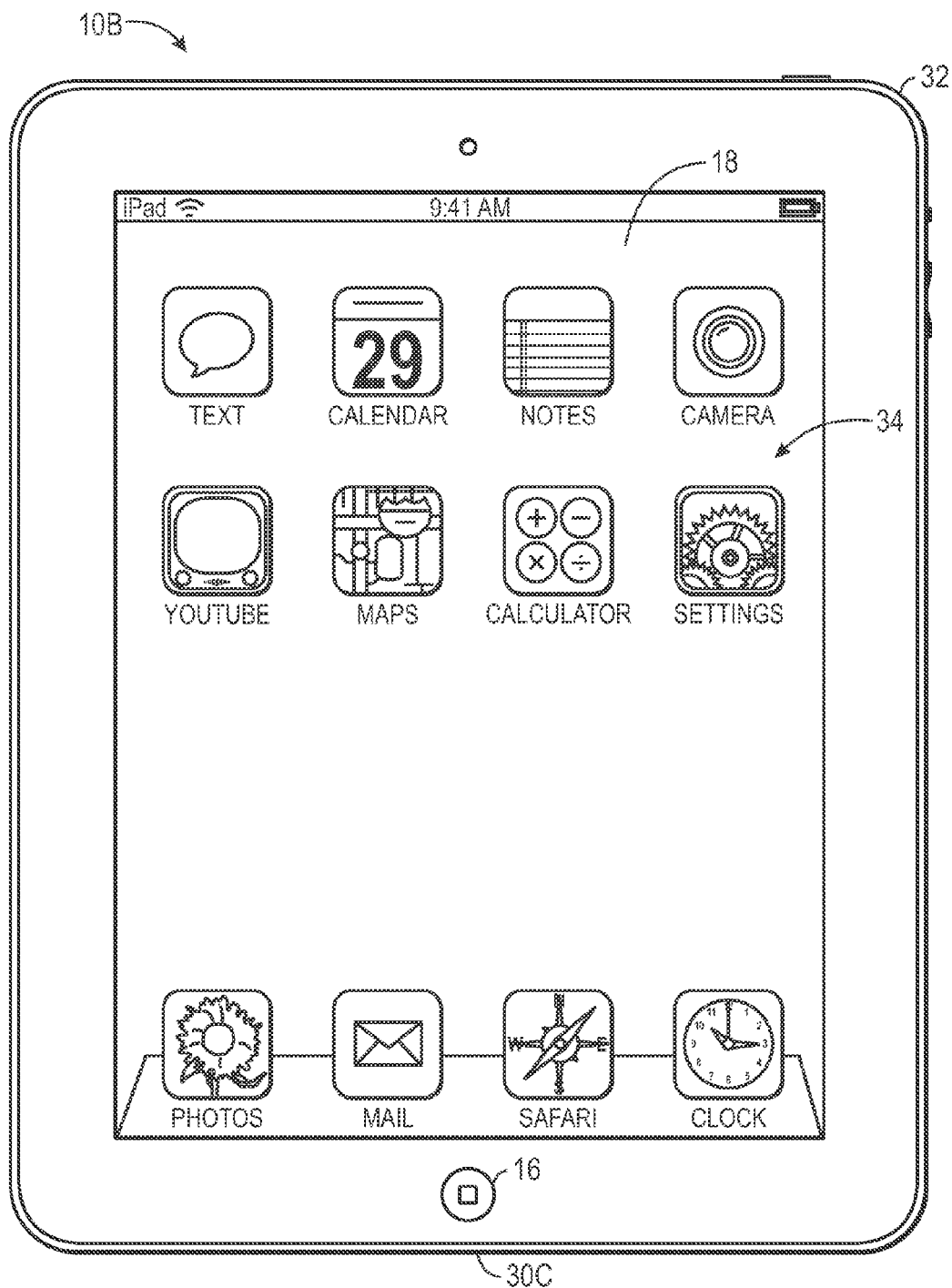
FIG. 3 is a front view of a tablet computing electronic device embodiment in accordance with present embodiments.

With these foregoing features in mind, a general description of suitable electronic devices for implementing aspects of the present techniques is provided. In FIG. 1, a block diagram depicting various components that may be present in electronic devices suitable for use with the present techniques is provided. In FIG. 2, one example of a suitable electronic device, here provided as a handheld electronic device, is depicted. In FIG. 3, another example of a suitable electronic device, here provided as a tablet computer, is depicted. These types of electronic devices, and other electronic devices providing suitable storage and/or processing capabilities, may be used in conjunction with the present techniques. For example, these and similar types of electronic devices may implement non-alphanumeric, non-biometric authentication schemes to access hidden or confidential information or functions in accordance with the teachings of the present disclosure.

An example of a suitable electronic device may include various internal and/or external components which contribute to the function of the device. FIG. 1 is a block diagram illustrating the components that may be present in such an electronic device 10 and which may allow the device 10 to function in accordance with the techniques discussed herein. As will be appreciated, the various functional blocks shown in FIG. 1 may include hardware elements (including application specific or generic circuitry), software elements (including computer code or instructions stored on a non-transitory machine-readable medium) or a combination of both hardware and software elements. It should further be noted that FIG. 1 is merely one example of a particular implementation and is merely intended to illustrate the types of components that may be present in a device 10. For example, in the presently illustrated embodiment, these components may include a display 18, I/O ports 12, input displays 14, data processing circuitry, such as one or more processors 14, a memory device 20, a non-volatile storage 22, expansion card(s) 24, a networking device 26, and a power source 28.

With regard to each of these components, the display 18 may be used to display various images generated by the device 10. The display 18 may be any type of display such as a cathode ray tube (CRT), a liquid crystal display (LCD), a light emitting diode (LED) display, an organic light emitting diode (OLED) display, or other suitable display. In certain embodiments of the electronic device 10, the display 18 may include a touch-sensitive element, such as a touch screen, and may be used to perform methods of entering, viewing, verifying, and saving authentication gestures.

The I/O ports 30 may include ports configured to connect to a variety of external devices, such as a power source or other electronic devices (such as handheld devices and/or computers, printers, projectors, external displays, modems, docking stations, and so forth). The I/O ports 30 may support any standard or proprietary interface type, such as a universal serial bus (USB) port, a video port, a serial connection port, an IEEE-1394 port, an Ethernet or modem port, and/or an AC/DC power connection port.

The input displays 16 may include the various devices, circuitry, and pathways by which input or feedback is provided to data processing circuitry, such as the processor 14. Such input displays 16 may be configured to control a function of the device 10 when actuated. For example, the input displays 16 may include buttons, sliders, switches, control pads, keys, knobs, scroll wheels, keyboards, mice, touchpads, and so forth. In certain embodiments, the input displays 16 may also include such components as global positioning system (GPS) circuitry and/or accelerometers that convey information about the location and/or orientation of the device 10 to the processor(s) 14.

In certain embodiments, an input structure 14 and display 18 may be provided together, such an in the case of a touch screen where a touch sensitive mechanism is provided in conjunction with the display 18. In such embodiments, the user may select or interact with displayed interface elements via the touch sensitive mechanism. In this way, the displayed user interface may provide interactive functionality, allowing a user to select, by touch screen or other input display, from among options displayed on the display 18.

User interaction with the input structure 14, such as to interact with a user or application interface displayed on the display 18, may generate electrical signals indicative of the user input. These input signals may be routed via suitable pathways, such as an input hub or bus, to data processing circuitry, such as the processor(s) 14, for further processing.

The processor(s) 14 may provide data processing capability to execute and support one or more operating systems, programs, user and application interfaces, software systems and applications, and any other functions of the electronic device 10. The processor(s) 14 may include one or more microprocessors, such as one or more "general-purpose" microprocessors, one or more special-purpose microprocessors and/or ASICS, a System-on-Chip (SoC) microprocessor, or some combination of such processing components and devices. For example, the processor 14 may include one or more reduced instruction set (RISC) processors, as well as graphics processors, video processors, audio processors and/or related chip sets.

The instructions or data to be processed by the processor(s) 14 may be stored in a memory 20. The memory 20 may be provided as a volatile memory, such as random access memory (RAM), and/or as a non-volatile memory, such as read-only memory (ROM). The memory 20 may store a variety of information and may be used for various purposes. For example, the memory 20 may store firmware executed by a processor 14 (such as basic input/output instructions or operating system instructions, including instructions implementing non-alphanumeric authentication (e.g., authentication not based on keys or characters found on a keyboard) as discussed herein), other programs that enable various functions of the electronic device 10, user interface functions, processor functions. In addition, the memory 20 and may be used for buffering or caching during operation of the electronic device 10.

The components may further include a non-volatile storage 22 for persistent storage of data and/or instructions. The non-volatile storage 22 may include flash memory, a hard drive, or any other optical, magnetic, and/or solid-state storage media. The non-volatile storage 22 may be used to store data files such as personal or business information (e.g., financial and other account information), software, wireless connection information (e.g., information that may enable the electronic device 10 to establish a wireless connection, such as a telephone or wireless network connection), and any other suitable data. In addition, the non-volatile storage 22 may also store code and/or data for implementing various functions of the electronic device 10, such as application or program code, data associated with such applications or programs, operating system code, user configured preferences, as well as code for implementing secure user authentication as discussed herein.

The embodiment illustrated in FIG. 1 may also include one or more card or expansion slots. The card slots may be configured to receive an expansion card 24 that may be used to add functionality, such as additional memory, I/O functionality, or networking capability, to the electronic device 10. Such an expansion card 24 may connect to the device through any type of suitable standard or proprietary connector, and may be accessed internally or external to the housing of the electronic device 10. For example, in one embodiment, the expansion card 24 may be flash memory card, such as a SecureDigital (SD) card, mini- or microSD, CompactFlash card, Multimedia card (MMC), or the like.

The components depicted in FIG. 1 also include a network device 24, such as a network controller or a network interface card (NIC). In one embodiment, the network device 24 may be a wireless NIC providing wireless connectivity over any 802.11 standard or any other suitable wireless networking standard. The network device 24 may allow the electronic device 10 to communicate over a network, such as a Local Area Network (LAN), Wide Area Network (WAN), cellular network, or the Internet. Further, the electronic device 10 may connect to and send or receive data with any device on the network, such as portable electronic devices, personal computers, printers, and so forth. Alternatively, in some embodiments, the electronic device 10 may not include a network device 24. In such an embodiment, a NIC may be added as an expansion card 24 to provide similar networking capability as described above.

Further, the components may also include a power source 28. In one embodiment, the power source 28 may be one or more batteries, such as a lithium-ion polymer battery. The battery may be user-removable or may be secured within the housing of the electronic device 10, and may be rechargeable. Additionally, the power source 28 may include AC power, such as provided by an electrical outlet, and the electronic device 10 may be connected to the power source 28 via a power adapter. This power adapter may also be used to recharge one or more batteries if present.

With the foregoing in mind, FIG. 2 illustrates an electronic device 10 in the form of a handheld device 10A, here a cellular telephone, that may be used to store confidential personal and/or professional information and/or to execute routines to facilitate secure authentication in accessing such information or other secured features (network connections, applications, and so forth) of the device 10A. It should be noted that while the depicted handheld device 10A is provided in the context of a cellular telephone, other types of handheld devices (such as media players for playing music and/or video, personal data organizers, handheld game platforms, and/or combinations of such devices) may also be suitable be provided as the electronic device 10. Further, a suitable handheld device 10A may incorporate the functionality of one or more types of devices, such as a media player, a cellular phone, a gaming platform, a personal data organizer, and so forth.

For example, in the depicted embodiment, the handheld device 10A is in the form of a cellular telephone that may provide various additional functionalities (such as the ability to take pictures, record audio and/or video, listen to music, play games, and so forth). As discussed with respect to the generalized electronic device of FIG. 1, the handheld device 10A may allow a user to connect to and communicate through the Internet or through other networks, such as local or wide area networks or cellular networks. For example, the handheld device 10A may allow a user to communicate using e-mail, text messaging, instant messaging, or other forms of electronic communication. The handheld electronic device 10A, may also communicate with other devices using short-range connections, such as Bluetooth and near field communication. By way of example, the handheld device 10A may be a model of an iPod® or iPhone®, or a derivative thereof, available from Apple Inc. of Cupertino, Calif.

In the depicted embodiment, a housing 32 includes input displays 16 through which a user may interface with the device. Each input display 14 may be configured to help control a device function when actuated. For example, in a cellular telephone implementation, one or more of the input displays 16 may be configured to invoke a "home" screen or menu to be displayed, to toggle between a sleep and a wake mode, to silence a ringer for a cell phone application, to increase or decrease a volume output, and so forth.

A display 18 of the handheld device 10A may be used to display a graphical user interface (GUI) 34 that allows a user to interact with the handheld device 10A. The GUI 34 may include various layers, windows, screens, templates, or other graphical elements that may be displayed in all, or a portion, of the display 18. In certain embodiments, the GUI 34 may include a gesture entry screen, a replay screen, and a verification screen to implement and facilitate the authentication of a user of the electronic device 10. Generally, the GUI 34 may include graphical elements that represent applications and functions of the electronic device. The graphical elements may include icons 36 and other images representing buttons, sliders, menu bars, and the like. The icons 36 may correspond to various applications of the electronic device that may open upon selection of a respective icon 36. Furthermore, selection of an icon 36 may lead to a hierarchical navigation process, such that selection of an icon 36 leads to a screen that includes one or more additional icons or other GUI elements. The icons 36 may be selected via a touch screen provided as the display 18 in certain embodiments, or may be selected by a user input display 14, such as a wheel or button In addition, the handheld device 10A may include data processing circuitry (such as one or more processors), network connectivity, memory, and storage capabilities, as described with respect to FIG. 1, which allow the handheld device 10A to store and execute the GUI or other applications suitable for implementing the present techniques. For example, the handheld device 10A may be configured to store and execute code suitable for accessing confidential information or secured applications or network connections using gestures input via a touch screen, a sequence of user selections of displayed objects, or other non-alphanumeric (e.g., non-keyboard), non-biometric inputs. Further, to the extent that the handheld device 10A has network connectivity, such connectivity may be utilized to update or modify an existing application or GUI on the handheld device 10A to provide such functionality, i.e., to update an operating system or software application to include new or modified functionality with respect to accessing secured data, applications, or connections on electronic devices.

In addition to handheld devices 10A, such as the depicted cellular telephone of FIG. 2, an electronic device 10 may also take the form of a computer or other types of electronic device on which confidential information might be stored and on which software code governing secure access to such information might be executed. Such computers may include computers that are generally portable (such as laptop, notebook, and tablet computers) as well as computers that are generally used in one place (such as conventional desktop computers, workstations and/or servers). In certain embodiments, the electronic device 10 in the form of computer may be a model of a MacBook®, MacBook® Pro, MacBook Air®, iMac®, Mac® mini, or Mac Pro® available from Apple Inc.

By way of example, a tablet computing device 10B embodiment of the electronic device 10 is illustrated in FIG. 3. The depicted tablet computing device 10B includes, a housing 32 includes a display 18, input displays 16, and input/output ports 30C. The input displays 16 (such as one or more pushbuttons and touchpad) may be used to interact with the tablet computing device 10, such as to start, control, or operate a GUI or applications running on the tablet computing device 10. For example, the touchpad may allow a user to navigate a user interface or application interface displayed on the display 18. In addition, the input and output ports 30C may allow connection of additional devices. For example, the tablet computing device 10B may include an I/O port 30C, such as a USB port or other port, suitable for connecting to another electronic device, such as a handheld device 10A.

In addition, as discussed with respect to the handheld device 10A, the tablet computing device 10B may include data processing circuitry (such as one or more processors), network connectivity, memory, and storage capabilities that allow the tablet computing device 10B to store and execute a GUI and other applications suitable for implementing the present techniques. For example, the tablet computing device 10B may be capable of storing and executing programming code encoding routines suitable for accessing confidential information or secured applications or network connections using non-alphanumeric and non-biometric inputs (e.g., gestures, sequences, and so forth). Further, to the extent that a tablet computing device 10B has network connectivity, such connectivity may be utilized to update or modify an existing application on the tablet computing device 10B to provide such functionality.

In certain embodiments, the tablet computing device 10B may provide the functionality of more than one type of electronic device, such as a device incorporating the functionality of two or more of a media player, a web browser, a cellular phone, a gaming platform, a personal data organizer, and so forth. For example, in the depicted embodiment, the tablet computing device 10B may provide various additional functionalities, such as the ability to display information, take pictures and record audio and/or video listen to music, play games, and so forth. By way of example only, the tablet computing device 10B may be a model of an iPad® tablet computer, available from Apple Inc.

With the foregoing discussion in mind, it may be appreciated that an electronic device 10 in either embodiment of a handheld device 10A or a tablet computing device 10B may be suitable for storing confidential or hidden information and providing user authentication via non-alphanumeric, non-biometric inputs or gestures as described herein. Accordingly, as used herein, the term "authentication" may refer to a system or process in which a supporting system or device (e.g., electronic device 10) securely identifies the user of the system or device prior to granting access to confidential information. Similarly, as used herein, the term "authorization" may refer to a system or process in which a supporting system or device (e.g., electronic device 10) determines the extent or level of access to confidential information an authenticated user should be allowed. The term "gesture" can be understood to encompass the movement of one or more fingers across or along a touch sensitive display or device (e.g., display 18), such as to move along a path, draw a pattern or shape, move a displayed virtual object, and so forth. Accordingly, the term "gesture," as will be further appreciated, can therefore be understood to be distinct from the simple act of touching the touch sensitive display, such as a touch screen or touch pad, at a single point or without movement along the surface of the touch sensitive display, as may occur when a button, icon, or object is typically selected using a touch sensitive display. Thus, in certain embodiments, a gesture can be understood to include one or more gesture strokes (or one or more finger touch travel paths). Though specific examples of the use of one type of electronic device or another might be described or discussed herein as storing confidential information or as providing user authentication and/or authorization via gesture, sequence, or other non-alphanumeric, non-biometric input, such discussion is intended as an example only and should not be construed as limiting or as indicative of a preference of one implementation over another. Instead, it should be understood that any suitable electronic device 10

(whether a portable handheld electronic device 10A, portable tablet computing device 10B, or other type of device) capable of storing confidential information, and receiving non-alphanumeric and non-biometric inputs that may be used to perform these respective functions in the various implementations described herein.

In certain embodiments, gestures are user definable, in which a user can define or configure the gesture, and are generated and entered by the user when prompted, such as when designating data or a function as having restricted access. That is, the act of designating data or a function as having restricted access may invoke an gesture entry routine (as opposed to a password or PIN entry routine) in which the user performs a desired gesture. As will be further appreciated, the user may enter, view, verify, and save the gesture to restrict access to confidential data or functions to only an authenticated and/or authorized user.

For example, in one implementation, code or instructions stored and/or executed on a handheld device 10A or tablet computing device 10B may be used to invoke display of one or more authentication screens, which may include a gesture entry screen, a gesture replay screen, and a gesture verification screen. The gesture entry screen, gesture replay screen, and gesture verification screen may collectively be part of an authentication system, which in turn allows a user to enter, view, verify, and save a gesture to restrict access to otherwise unavailable (e.g., confidential, hidden, and so forth) data or functions (e.g., applications or network connections).

Figure 4:
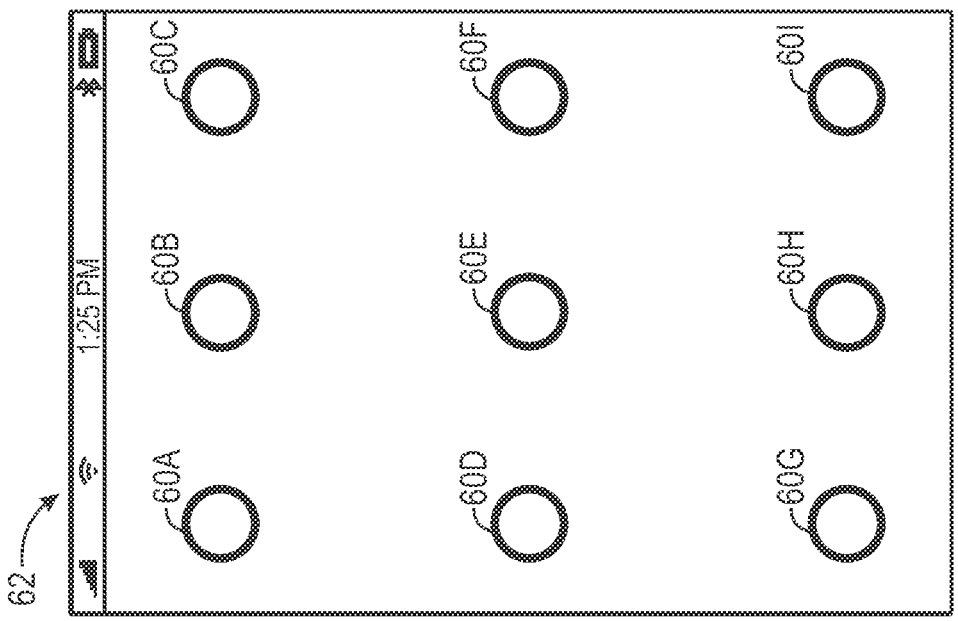
FIG. 4 is a view of a gesture authentication screen in accordance with present embodiments.

In certain embodiments, as depicted in FIG. 4, an implementation of an authentication screen 62 for use with gestures is depicted with respect to the display 18 (e.g., touch-sensitive display) of the electronic device 10. The authentication screen 62 may include an array of selectable graphical elements 60A, 60B, 60C, 60D, 60E, 60F, 60G, 60H, 60I, which may each serve as initiation and/or destination locations for user gestures. As will be appreciated, though the depicted example employs touch sensing areas that are circular in shape, other shapes of touch sensing areas (e.g., triangular, square, star-shaped, and so forth) suitable for marking a location on the touch sensitive display 18 may be employed. Likewise, though a 3×3 grid is depicted, other sizes and shapes of grids of graphical elements 60A-60I may be displayed, e.g., 2×2, 2×3, 3×4, 4×4, 5×5, and so forth. In some embodiments, the graphical elements 60A-60I may be randomly arranged on the authentication screen 62, or may be customized (e.g., arranged by the user) to the preference of the user. Further, the size of the graphical elements 60A-60I may vary in different implementations to represent the tolerance and/or precision associated with the gesture. For example, larger graphical elements 60A-60I may be associated with greater tolerance in evaluating a gesture or vice versa. It should be further appreciated that the authentication screen 62 may also include one or more invisible touch sensing areas instead of or in addition to the visibly displayed graphical elements 60A-60I. For example, in one embodiment, the authentication screen 62 may display no visible graphical elements 60A-60I, but instead may allow a user to enter a gesture over preferred display images (e.g., photos) or over a dark display screen.

Figure 5:
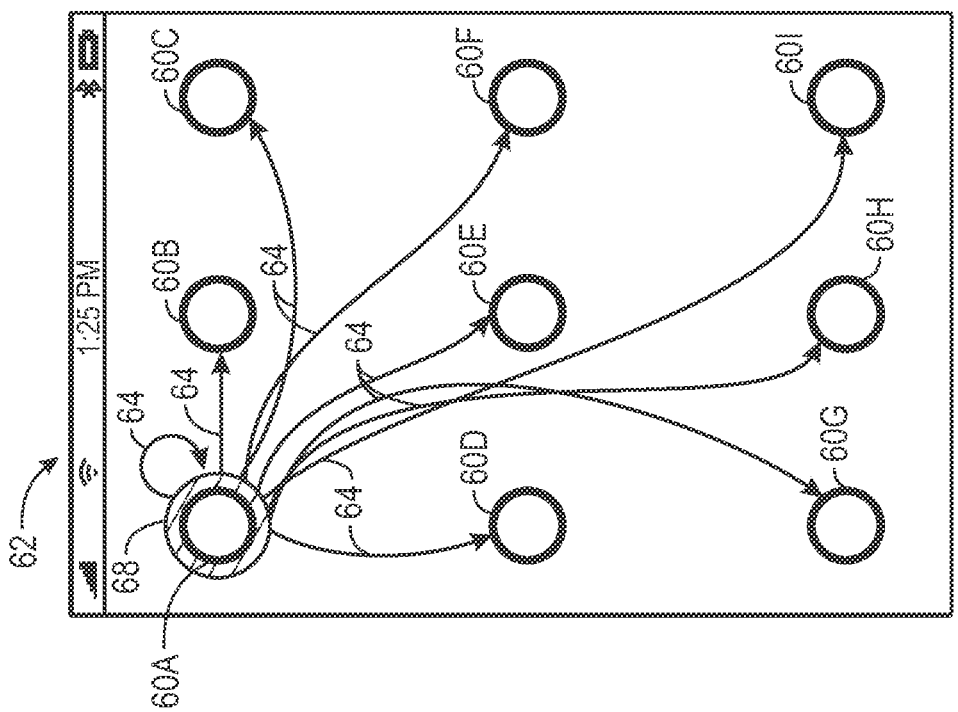
FIG. 5 depicts an example of entered gestures on the screen of FIG. 4 in accordance with present embodiments.

Referring to FIG. 5, in certain embodiments, a user may enter a gesture using one or more gesture strokes 64. The gesture strokes 64 may begin and end at any one of the graphical elements 60A-60I, including beginning and ending at the same graphical element, for example, by using a small circular gesture or similar gesture that returns to the initial graphical element. As discussed above, the path a finger travels between one or more of the graphical elements 60A-60I may also constitute a gesture evaluated to authenticate a user. For example, in one embodiment, the gesture strokes 64 may include a user moving one or more fingers across the surface of the display 18 (e.g., touch-sensitive display) to invoke an authentication routine, for example, by performing a gesture using the touch screen. Thus, as implemented as an input to the electronic device 10, a gesture may be described by a sequence of locations (e.g., a series of coordinates) input via a user touching the display 18. As discussed herein, such a sequence of locations may include more than one location being input concurrently. That is, a multi-touch may be implemented by the user, in which more than one finger may be involved in making a gesture on the display 18 at any given time.

Further, a sequence of locations may be defined not only by location in space, or where the contact is occurring, but by respective timing, or when the contact or movement is occurring. In this way, the velocity or acceleration of the finger or fingers on the touch sensitive display 18 or the addition or removal of fingers involved in the gesture at a particular point in time may define the gesture. Likewise, in certain embodiments, pauses may be incorporated into the gesture such that a gesture is evaluated based on whether the pauses are present at particular times when tracing the gesture.

Thus, as an input, a gesture may be understood to encompass sequential locations or positions (e.g., coordinates) identified by the movement of a finger or fingers on a touch sensitive display 18. The input associated with such a gesture may also include a temporal component that may be evaluated separately from the spatial component (i.e., the movement of a second finger is included or removed from the gesture movement at a particular point in time) or may be evaluated in conjunction with the spatial component (i.e., the velocity and/or acceleration of the finger when moving across the touch-sensitive display may constitute part of the gesture).

As will be discussed in greater detail below, an input associated with one or more gesture strokes 64 may be further characterized by other factors. For example, the total distance traveled by a finger in performing one or more gesture strokes 64 may be a factor used to characterize the gesture. That is, two different gesture strokes 64 may begin and end at the same points on a touch-sensitive display such as the display 18, but may travel different paths of different lengths in moving between the otherwise identical beginning and ending locations. In such a context, the actual path traced or the distance traveled may be used to characterize the authentication gesture. Likewise, the direction of a movement may be used to characterize the authentication gesture. For example, a clockwise circular motion and a counterclockwise circular motion may start and stop at the same locations and may involve a movement of the same distance. However, such complementary movements may be distinguished based on the directionality of the motion in addition to the actual path traveled.

Further, in certain embodiments, the speed at which all or part of the authentication gesture is executed, or the speed at which the path or paths are traveled between graphical elements 60A-60I, may constitute part of the gesture that is estimated or evaluated. For example, the gesture may be authenticated if performed at a certain speed or range, or if certain gesture strokes 64 of the gesture are performed at one speed while other gesture strokes 64 of the gesture are performed at a different speed. As will be discussed in greater detail, in such an embodiment, a visible trace or color illuminated trail may be displayed on the authentication screen 62 (such as a colored circle or trail centered on the moving fingertip) which changes color, shading or hatching based on the speed of the fingertip motion.

As an example of various gesture stokes 64, and by extension various potential gestures, as depicted in FIG. 5, a user may begin a gesture at a first graphical element 60A, as shown by finger contact disc 68 overlying the first touch area 60A. As depicted by the gesture strokes 64, the user may perform all or part of a gesture by moving his or her finger, while in contact with the display 18, to any of the graphical elements (e.g., 60B-60I), including the first graphical element 60A, as well as any invisible touch sensing area of the authentication screen 62. Thus, in the depicted example a simple gesture from a first graphical element to a second graphical element, excluding path, speed, distance, and so forth, may yield at least 81 (i.e., 9×9 touch sensing areas) possible combinations. Accordingly, each additional graphical element (e.g., 60A-60I) added to the authentication gesture may increase the number of possible combinations by a factor of 9. For example, an gesture moving from a first to a second to a third graphical element (e.g., 60A to 60B to 60C) may have 729 combinations, while a fourth graphical element (e.g., 60A to 60B to 60C to 60D) may yield 6,561 combinations, and so forth.

Figure 6A:
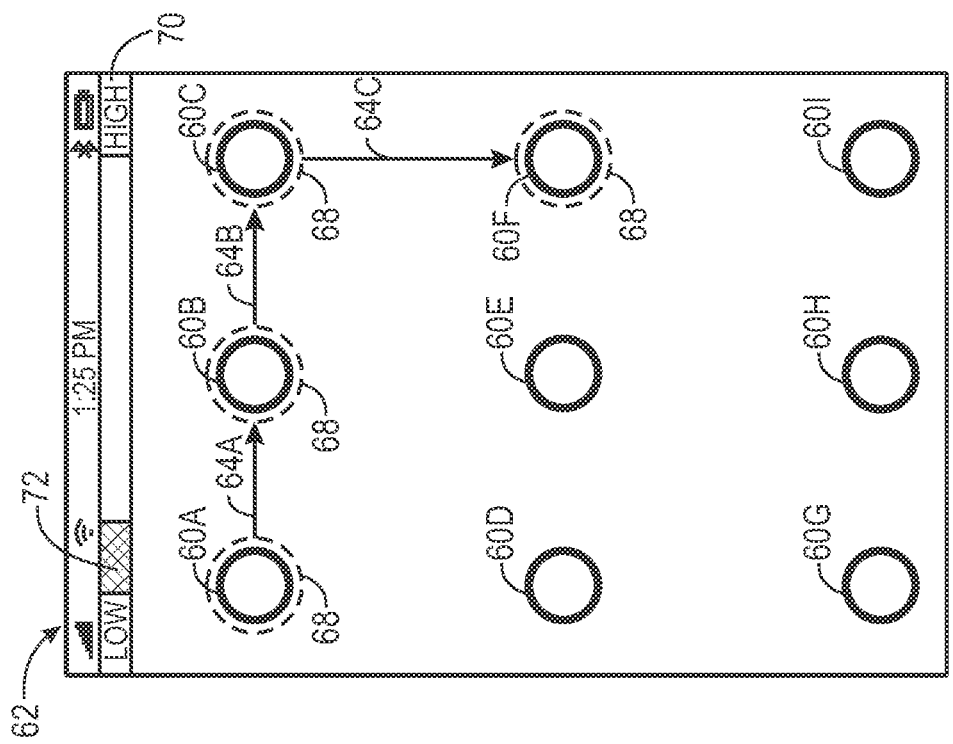
FIGS. 6A-6D depict alternative examples of entries of gestures and corresponding strength indicators on the screen of FIG. 4 in accordance with present embodiments.
Figure 6:
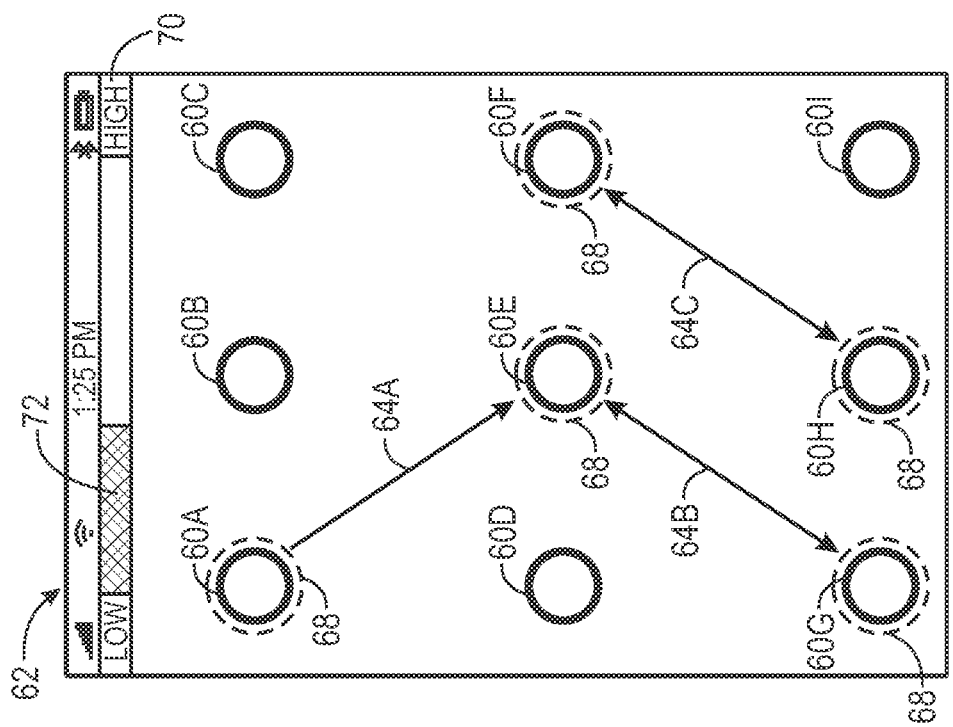
FIG. 6 depicts an example of an entry of a gesture and a strength indicator on the screen of FIG. 4 in accordance with present embodiments.

In certain embodiments, a gesture entry screen 62A, a gesture replay screen 62B, and/or a gesture verification screen 62C of the one or more authentication screens 62 may each include a gesture strength estimation indicator 70. As depicted in FIG. 6, the gesture strength estimation indicator 70 may include a progress bar 72 that may indicate to a user the strength (or the measure of length, complexity, unpredictability, entropy or randomness, general security, and so forth) of a gesture (e.g., strokes 64A-64C) being entered or having been entered by the user. The progress bar 72 of the gesture strength estimation indicator 70 may range or extend from a "Low" end of the strength estimation indicator 70 to a "High" end (e.g., transition from empty to full) of the indicator 70 in proportion to the strength of the gesture (e.g., gesture strokes 64A-64C) entered by the user. For example, the progress bar 72 may extend a proportional percentage (e.g., 10% extension to 100% extension) to indicate a weak, medium, or strong entered gesture. The progress bar 72 of the gesture strength estimation indicator 70 may further display varying colors in proportion to the strength of the gesture entered by the user. For example, the color red may indicate a weak gesture, yellow a gesture of medium strength, while green may indicate a strong gesture.

As it may be worth noting, the extension and variation in color of progress bar 72 may each either concurrently indicate gesture strength or each sequentially indicate gesture strength. For example, the progress bar 72 may extend in 10 percent increments from "Low" to "High" while concurrently displaying varying colors (e.g., red, orange, yellow, green, etc.) to indicate gesture strength. However, in certain embodiments, the progress bar 72 may extend in 10 percent increments up to 100 percent, and subsequently display varying colors (e.g., red, orange, yellow, green) to indicate an even stronger gesture.

Figure 6C:
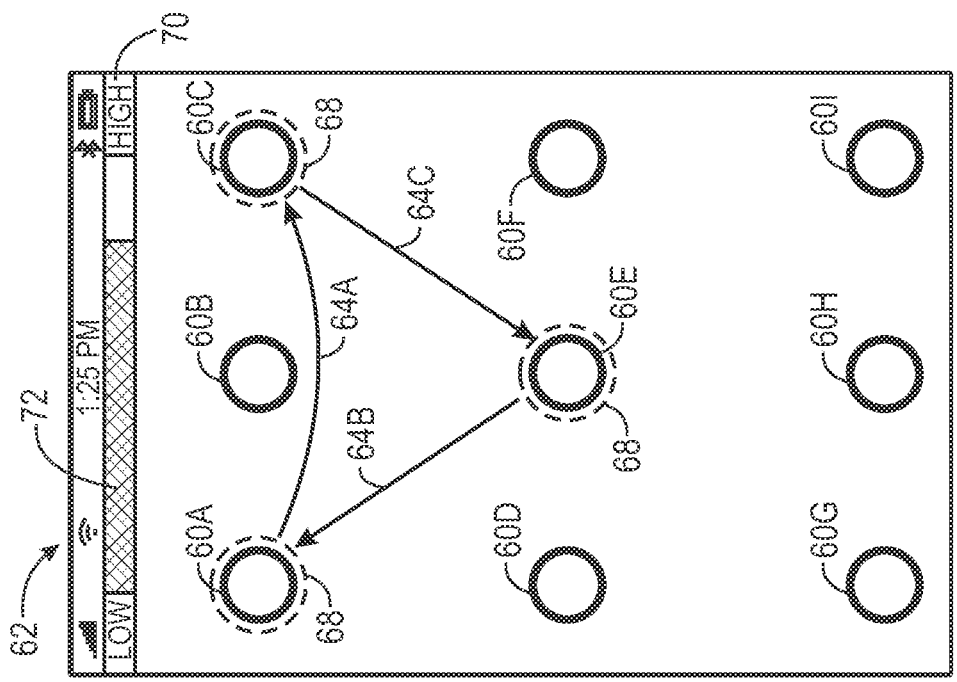
Figure 6B:
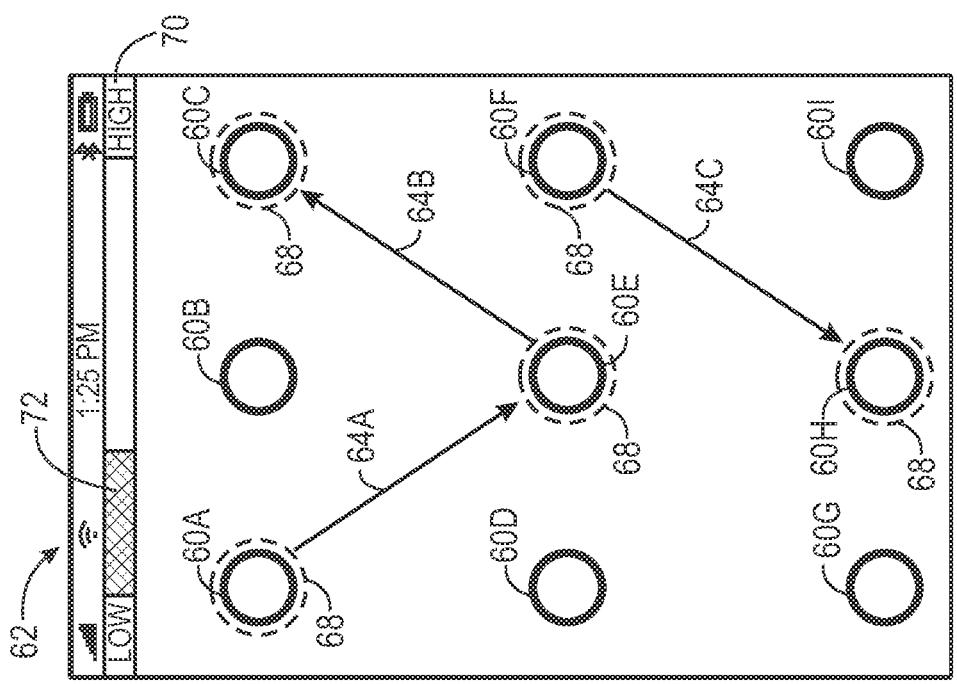

To further illustrate, various examples of entered gestures and corresponding gesture strength estimation indicators 70 are depicted in FIGS. 6A-6D. For example, FIG. 6A displays a relatively simple gesture (e.g., gesture strokes 64A-64C) going directly through only four touch sensing areas (e.g., 60A-60F). Accordingly, the gesture strength estimation indicator 70 may indicate a weak gesture, displaying, for example, a red, 10% extended progress bar 72. FIG. 6B displays a slightly more longer or stronger gesture input, going from graphical elements 60A to 60E to 60C to 60F, and lastly to 60H. Accordingly, the progress bar 72 is extended to a greater length, for example, and may display an orange or similar medium (e.g., between red and green) color. FIG. 6C displays a much stronger gesture, in that the gesture stroke 64A travels between the visible graphical elements 60B-60E. Similarly, FIG. 6D displays a multi-touch gesture, in which gesture strokes 64A and 64B, for example, may be performed concurrently, followed by the gesture stroke 64C traveling between graphical elements 60E and 60F, and finally gesture stoke 60D traveling from graphical element 60F to graphical element 60I. As a result, gesture strength estimation indicators 70 of FIGS. 6C and 6D may each indicate strong gestures, displaying, for example, a green, near fully-extended progress bar 72.

Figure 7:
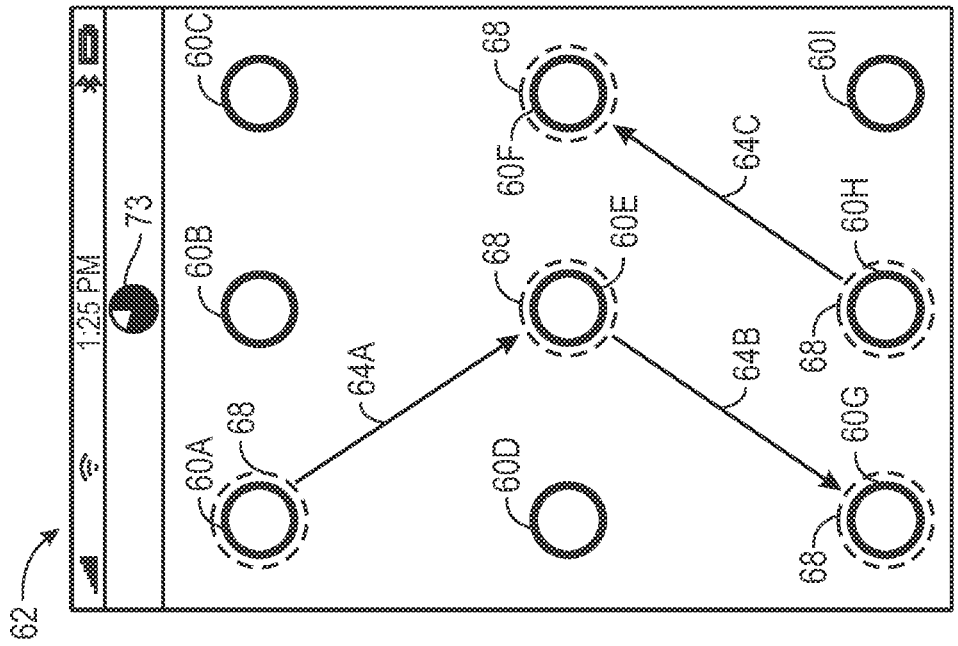
FIG. 7 depicts an example of an entry of a gesture and a timer indicator on the screen of FIG. 4 in accordance with present embodiments.
Figure 6D:
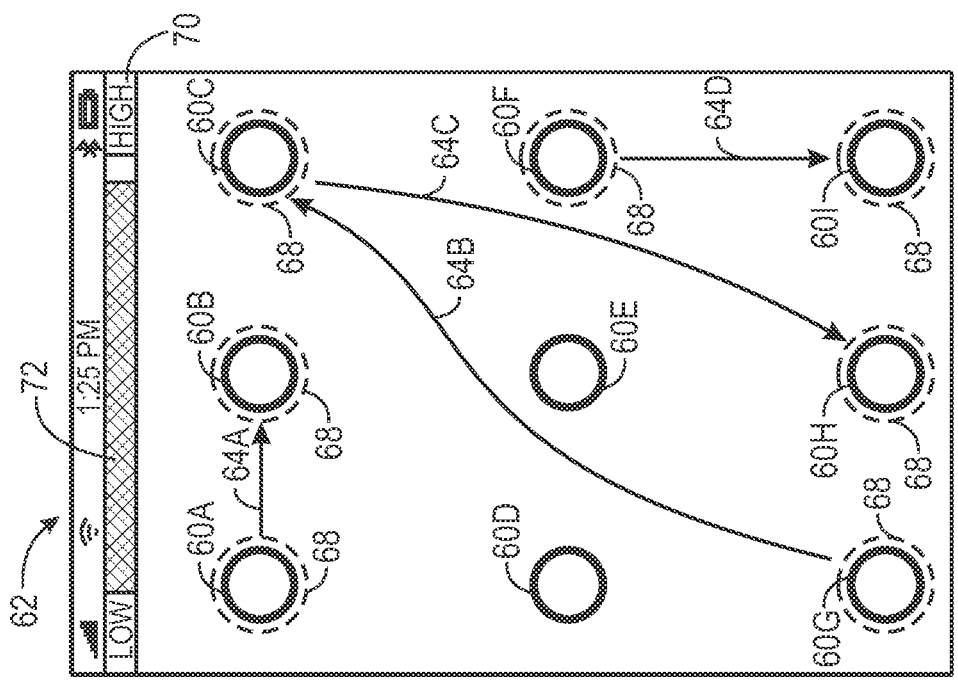

In certain embodiments, the gesture entry screen 62A, the gesture replay screen 62B, and/or the gesture verification screen 62C of the one or more authentication screens 62 may also each include a timer indicator 73, as depicted in FIG. 7. The timer indicator 73 may indicate a time elapsed while the user enters a gesture. For example, the time elapse indicated by timer indicator 73 may be based on the time it takes to travel a number of graphical elements 60A-60I the user touches. Alternatively the elapsed time indicated by the timer indicator 73 may be on the total distance traveled for each gesture stroke 64 performed by the user. In one embodiment, the timer indicator 73 may allow a user to view a specified amount of time he or she should be allotted to complete a gesture. For example, a user may set and save the allotted time for entering a gesture to, for example, 10 seconds. In such the case, each subsequent time the user enters a gesture, the timer indicator 73 may display a 10-second time revolution. In certain embodiments, the strength of a gesture may be based on a specified allotted time.

Figure 8:
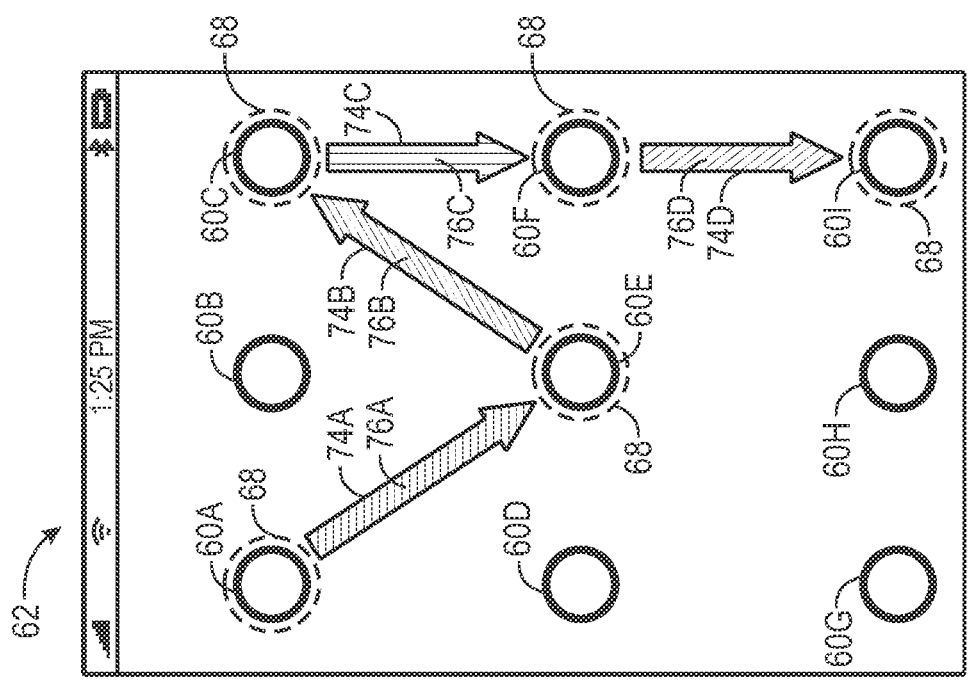
FIG. 8 depicts an example of an entry of a gesture and color-varying visible traces of the gesture on the screen of FIG. 4 in accordance with present embodiments.

In certain embodiments, the gesture entry screen, the gesture replay screen, and the gesture verification screen may each further include visible traces 76. The visible traces 76 may be a series of illuminated trails or fading marks to indicate and display estimated positions or paths of the gesture strokes 64 performed by the user, for example, on the gesture entry screen 62A. As depicted in FIG. 8, the visible traces 74A, 74B, 74C, 74D may originate from the center of the estimated position of the gesture, and follow the path of gesture strokes 64 performed by the user until the completion of the gesture. The visible traces 74A, 74B, 74C, 74D may be displayed with both varying colors and lengths depending on gesture parameters such as the speed of the gesture stroke 64, the strength of the gesture, and the time elapsed during the entering of the gesture. For example, again referring to FIG. 8, as the user moves his or her finger through the path from graphical element 60A to graphical element 60I, the visible traces 74A, 74B, 74C, 74D may each display varying colors 76A-76D (e.g., red, orange, yellow, green, and so forth) according to the speed of the gesture stroke, as the speed of the gesture stroke may contribute to the strength of the gesture.

Figure 9:
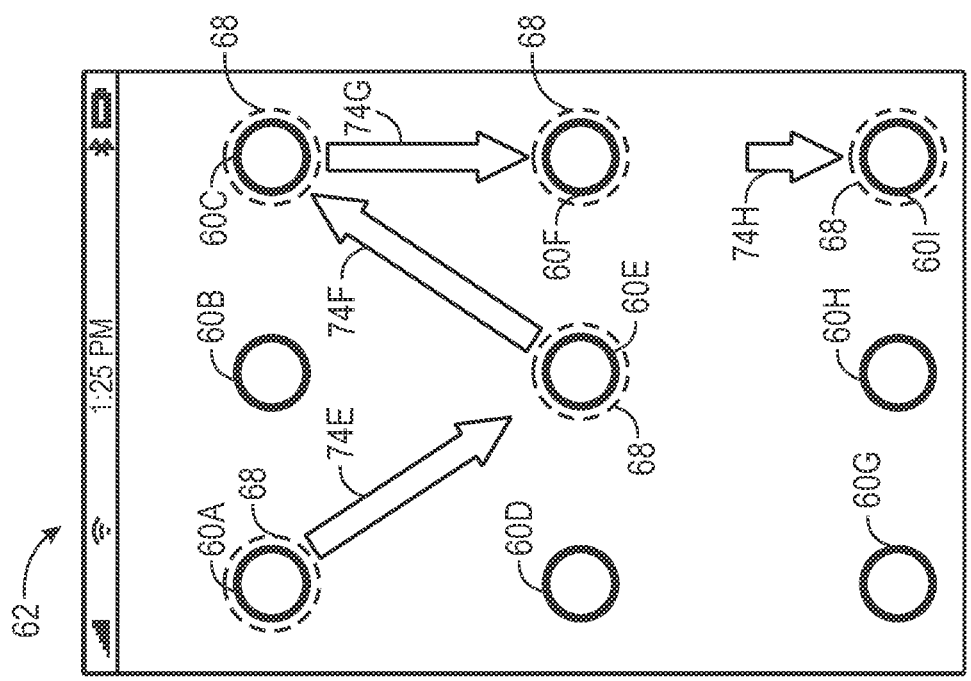
FIG. 9 depicts an example of an entry of a gesture and length-varying visible traces of the gesture on the screen of FIG. 4 in accordance with present embodiments.

Similarly, FIG. 9 displays visible traces 74E-74H, in which each are shown in varying lengths. As noted above with respect to visible traces 74A, 74B, 74C, 74D of FIG. 8, the length of the visible traces 74E-74H may be proportional to the speed of each of the gesture strokes 64. For example, visible trace 74E may represent a fast motion gesture stroke 64 from graphical element 60A to graphical element 60E. In contrast, visible trace 74H may represent a much slower gesture stroke as the user travels from graphical element 60F to element 60I.

Figure 10:
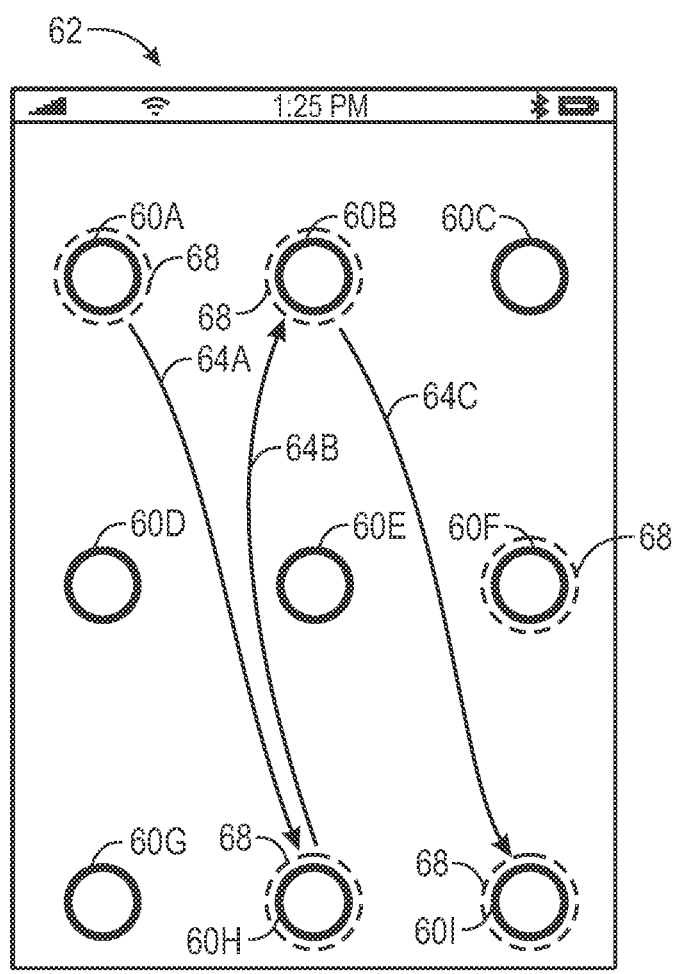
FIG. 10 depicts a further example of an entry of a gesture on the screen of FIG. 4 in accordance with present embodiments.

As noted above with respect to FIG. 5, in certain embodiments, the strength of the gesture, and by extension security, may be increased by allowing multi-touch gestures, in which two or more fingers are deployed concurrently, allowing more than one finger contact point 68 at a time on the display 18. Furthermore, the strength may be increased by tracing different paths between the graphical elements 60A-60I. For example, referring now to FIG. 10, the gesture strokes 64A, 64B, and 64C are respectively traveled by moving a finger from a graphical element 60A between graphical elements 60D and 60E to graphical element 60H, again between graphical elements 60D and 60E up to graphical element 60B, and finally between graphical elements 60E and 60F down to graphical element 60I. Thus, in such embodiments, strength may be increased, as traveling between visible graphical elements (e.g., 60A-60I) may be more random and less intuitive to, for example, an unauthorized user of the electronic device 10. Similarly, by using such multi-touch gestures, the complexity of the authentication gesture may be increased. For example, in an embodiment where two fingers are used and each finger can move from an initial graphical element to any other graphical element, each stage of the multi-touch gesture has 81 possible combinations, or 9 possibilities for each finger at each stage. Thus, each stage of a multi-touch gesture in which two fingers are used may increase the complexity of the gesture by a factor of 81.

Figure 11:
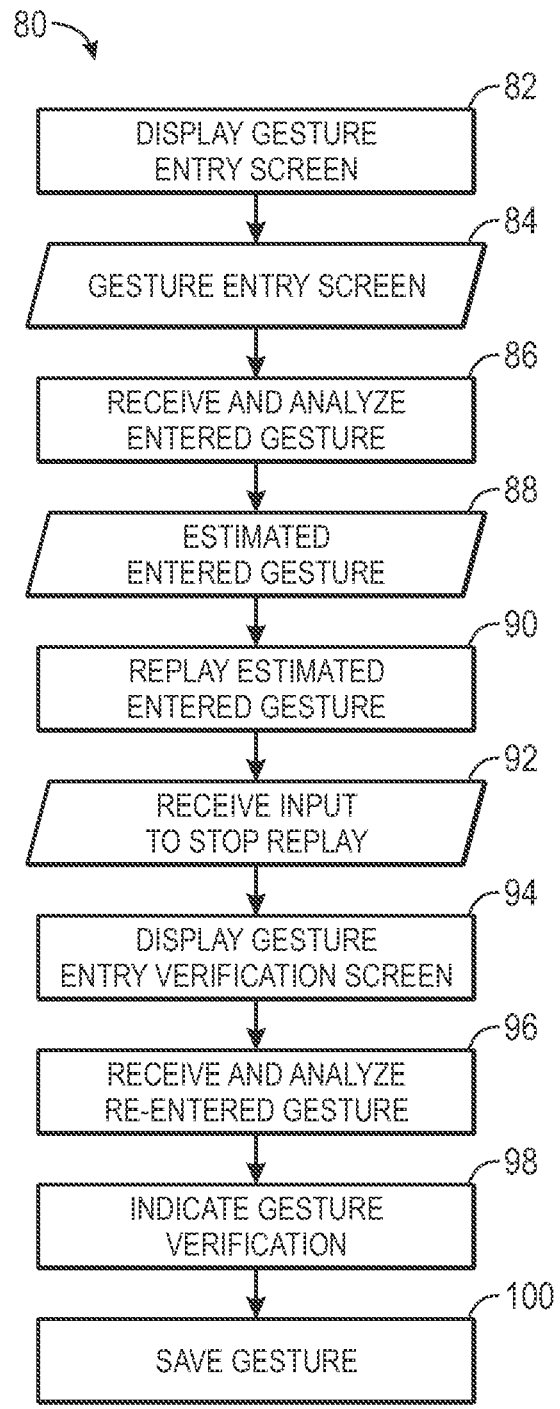
FIG. 11 is a flowchart of an embodiment of a process suitable for entering a gesture, replaying the entered gesture, verifying the entered gesture, and saving the verified gesture for authenticating a user, in accordance with present embodiments.

Turning now to FIG. 11, a flow diagram is presented, illustrating an embodiment of a process 80 useful in displaying the gesture entry screen 62A, the gesture replay screen 62B, and the gesture verification screen 62C for the purpose of user authentication and/or authorization. Further, for the purpose of illustration, the flow diagram of FIG. 11 will be discussed in conjunction with FIGS. 12-20. The process 80 may include code or instructions stored in a non-transitory machine-readable medium (e.g., the memory 20) and executed, for example, by the processor(s) 14. The gesture entry screen 62A may allow a user of the electronic device 10, for example, to enter a unique or desired gesture using the array or other arrangement of graphical elements (e.g., 60A-60I) by employing any number of gestures (e.g., double touch, drag, flick, multi-touch, and so forth). Following, the gesture replay screen 62B may display the same array or other arrangement of graphical elements as the gesture entry screen 62A, allowing the user, for example, to continuously behold a replay or playback of the estimated entered gesture. Subsequently, the gesture verification screen 62C, which may also display the same array or arrangement of graphical elements as the gesture entry screen 62A, may, for example, allow the user to re-enter or verify the initial gesture entered and viewed by the user via the gesture entry screen 62A and gesture replay screen 62B.

Figure 13:
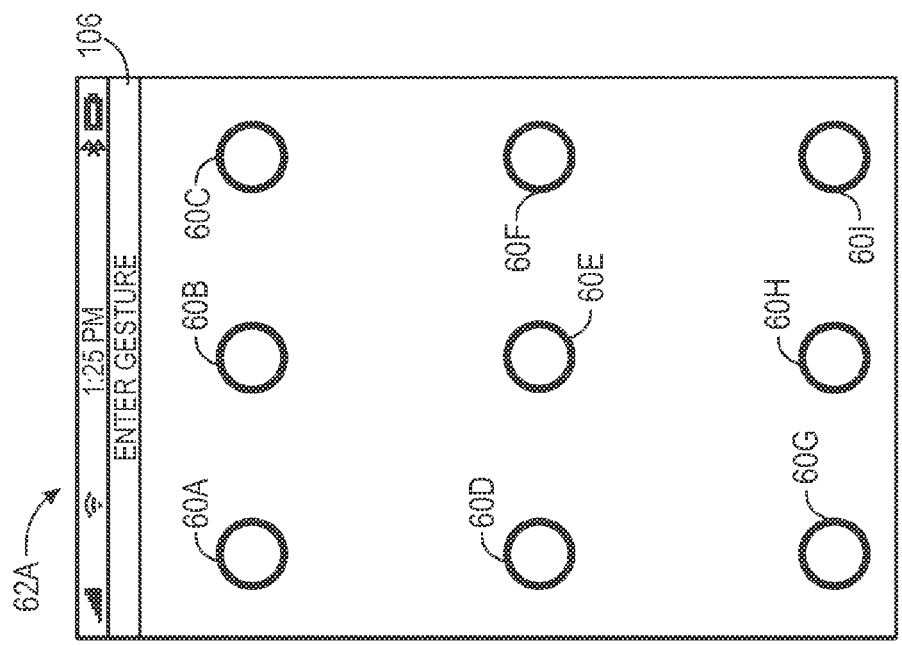
FIGS. 12-14 depict example embodiments of a gesture entry screen in accordance with present embodiments.
Figure 12:
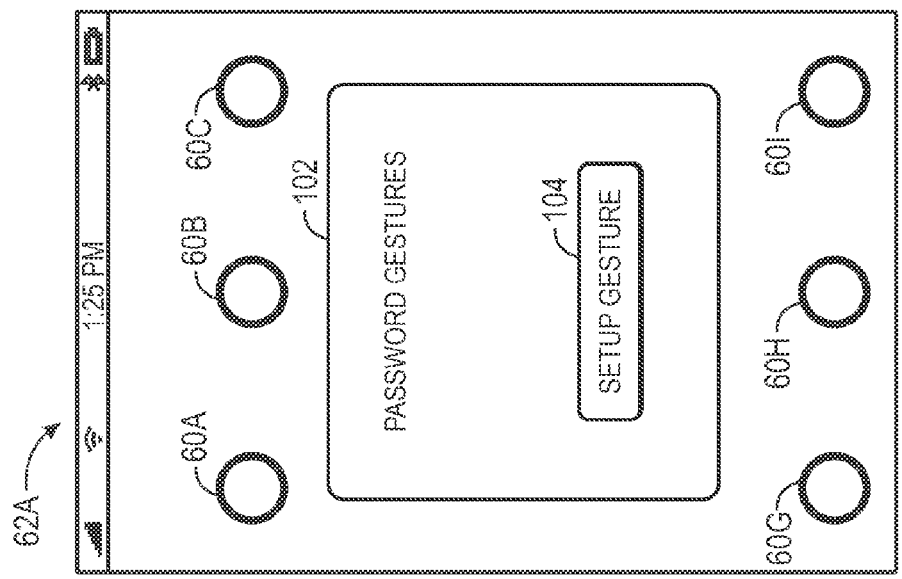
Figure 14:
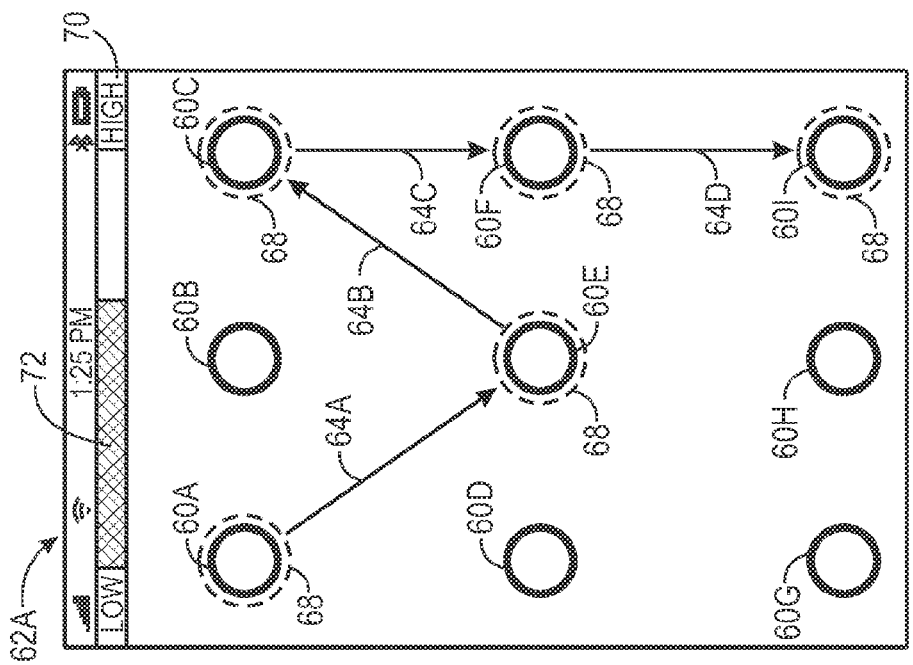

The process 80 may begin with the electronic device 10 displaying (block 82) the gesture entry screen 62A. For example, the gesture entry screen 62A may appear as depicted in FIG. 12. The user may see an introductory screen element 102, and selectable screen element 104, prompting the user to select the screen element 104 to setup or establish an authentication gesture. The user may then view the gesture entry screen 62A (block 84 of FIG. 11), which, as previously noted with respect to FIG. 4, may include an arrangement of visible graphical elements 60A-60I, and further a display screen element 106 instructing the user to enter a desired gesture as depicted in FIG. 13. The electronic device 10 may then receive and analyze (block 86 of FIG. 11) an estimated gesture entered by the user. For example, as depicted in FIG. 14, the user may see a strength estimation indicator 70 and progress bar 72, indicating to the user the strength of the gesture estimated (block 88 of FIG. 11) as the user performs gesture strokes 64. As previously noted, the progress bar 72, for example, may both extend from the "Low" end to the "High" end of the strength indicator 70, as well as display varying colors (e.g., red, yellow, green) to indicate gesture strength based on an estimate of the entered gesture as the user enters a desired authentication gesture. The finger contact discs 68 may be displayed as the user touches each of the graphical elements 60A, 60E, 60C, 60F, and 60I.

Figure 15:
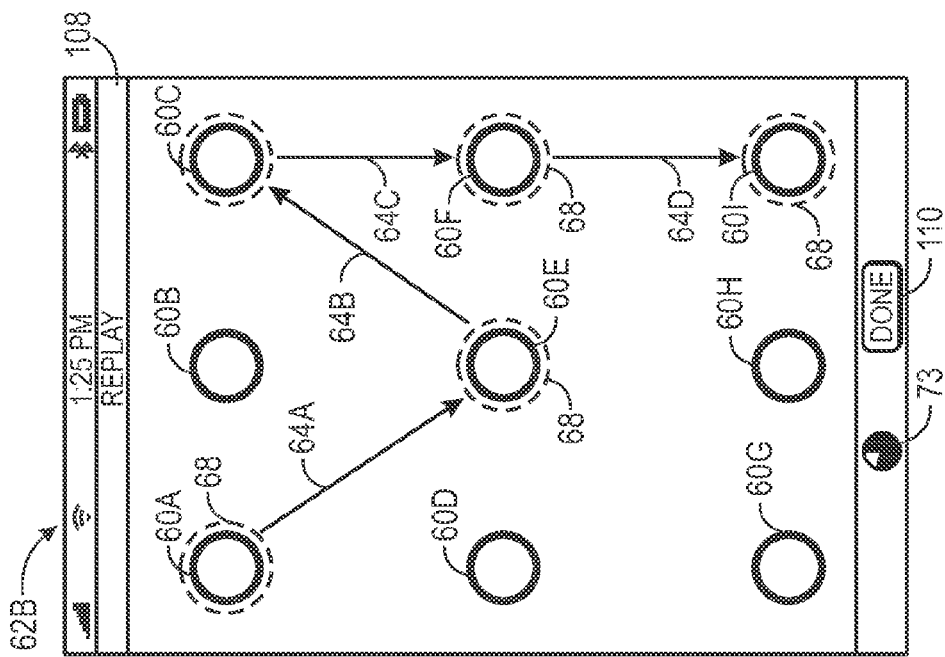
FIG. 15 depicts example embodiments of a gesture replay screen in accordance with present embodiments.

Upon the user's completion of entering a desired gesture input, the process 80 may continue with the electronic device 10 displaying a replay of an estimate of the gesture entered by the user (block 90 of FIG. 11). As it may be worth noting, in some embodiments, the electronic device 10 may estimate or register a gesture not exactly intended by the user. The gesture replay screen 62B, as depicted in FIG. 15, may be included in the gesture authentication process 80 to allow the user to view or review one or more complete cycles of the gesture entered by the user on the previous gesture entry screen 62A. That is, instead of entering a gesture, the user watches via the replay screen 62B, for example, a repeated replay of the already entered gesture to commit the entered gesture to memory and/or to confirm that the replayed gesture is indeed the gesture intended by the user. As depicted in FIG. 15, each of the graphical elements 60A, 60E, 60C, 60F, and 60I touched by the user during gesture entry (e.g., via gesture entry screen 62A) are sequentially illuminated traveling from the first touched graphical element (e.g., 60A) along the path of each gesture stroke 64 to the last touched graphical element (e.g., 60I) included in the entered gesture.

In certain embodiments, the replay screen 62B may also include the timer indicator 73 and a selectable done button 110. The time indicator 73 may replay, for example, the time elapsed during the entry of the gesture. The selectable done button 110 may allow the user to stop the repeated replays (block 92 of FIG. 11) at any time, and progress to the display of the gesture verification screen 62C (block 94 of FIG. 11). It should also be appreciated that the gesture replay screen 62B may be bypassed for the gesture verification screen 62C at anytime at the discretion of the user.

Figure 17:
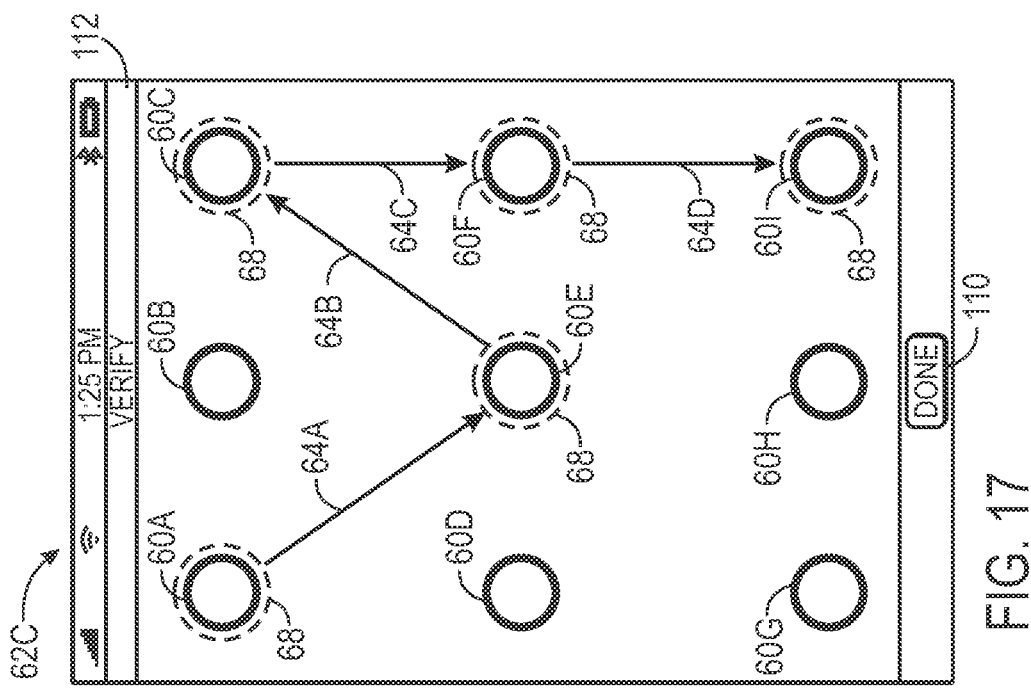
FIGS. 16-20 depict example embodiments of a gesture verification screen in accordance with present embodiments.
Figure 16:
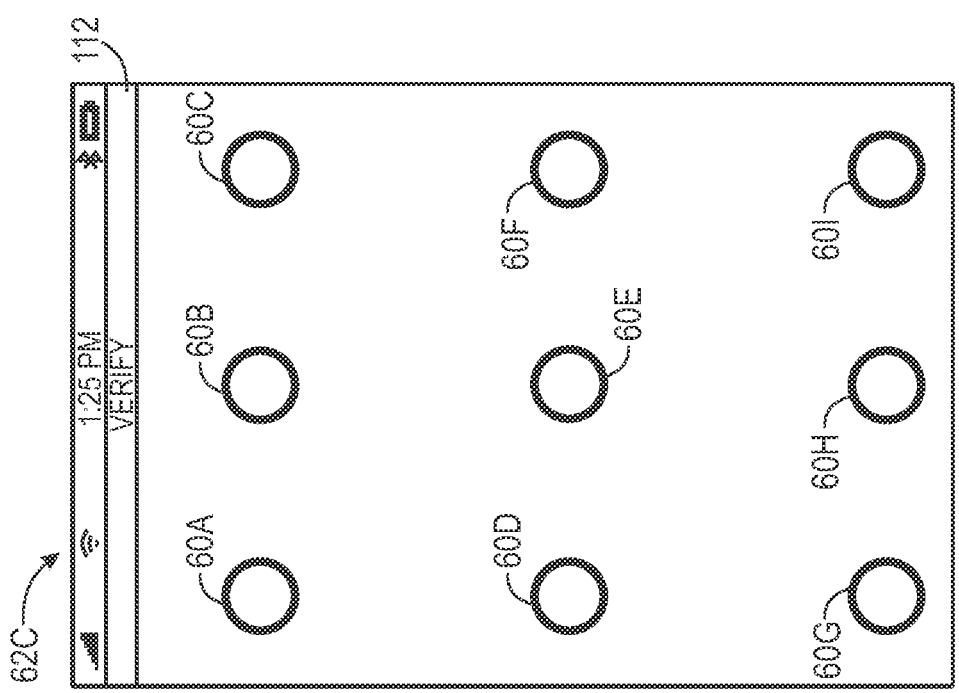

The gesture input verification screen 62C may be displayed similarly to the initial gesture entry screen 62A, thus allowing the user to verify or re-enter the same gesture entered via the gesture entry screen 62A and/or viewed via the gesture replay screen 62B. For example, as shown in FIG. 16 and FIG. 17, the user may perform gesture strokes 64, traveling along the graphical elements 60A, 60E, 60C, 60F, and 60I to re-enter the gesture, which may have been previously entered via the gesture entry screen 62A and viewed via the gesture replay screen 62B. The electronic device 10 may then receive and analyze the re-entered gesture (block 96 of FIG. 11), comparing the re-entered gesture with the gesture initially entered via the gesture entry screen 62A and viewed via the gesture replay screen 62B. The gesture verification screen 62C may then verify and indicate (block 98 of FIG. 11) to the user, for example, whether or not the re-entered gesture matches the initially entered gesture. For example, the gesture verification screen 62C may display various colors in the background of the screen to indicate to the user whether or not the path of the re-entered gesture is consistent with and verified as the initially entered gesture.

Figure 19:
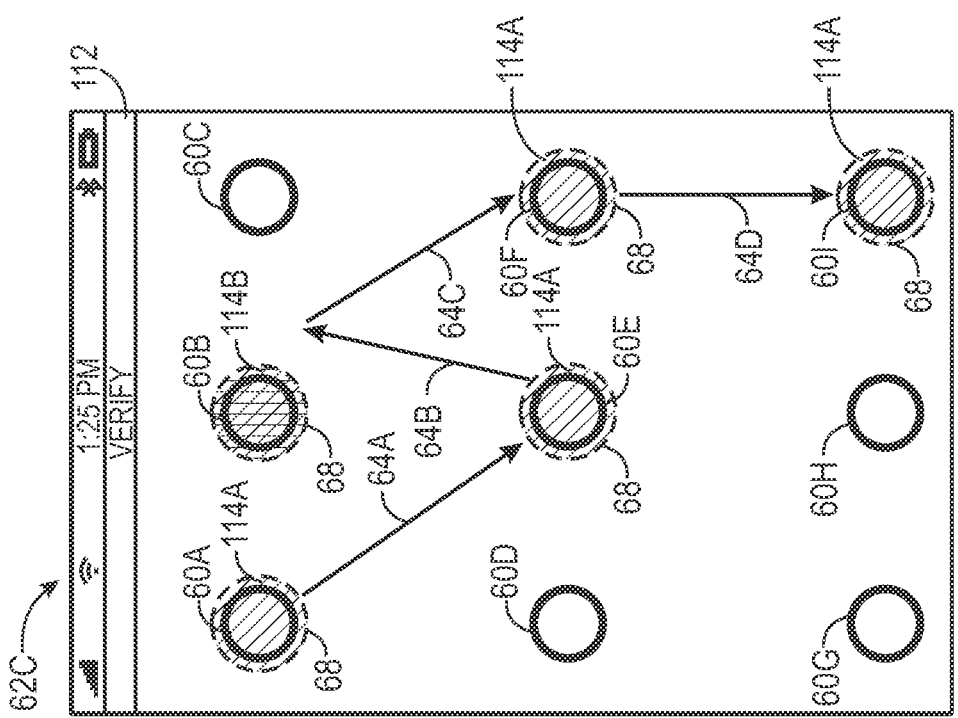
Figure 18:
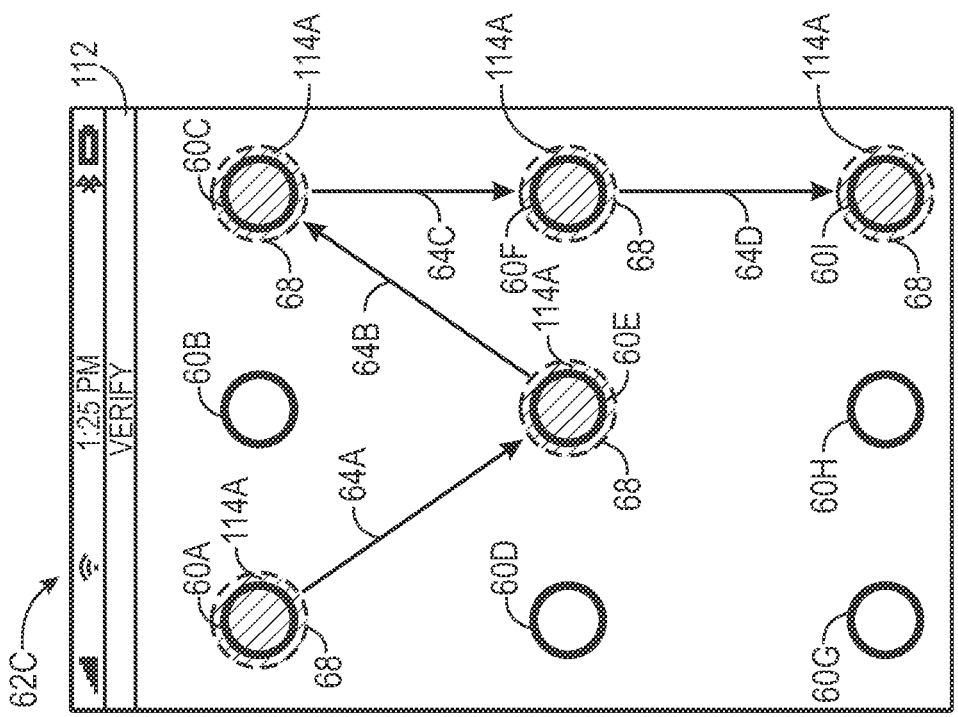
Figure 20:
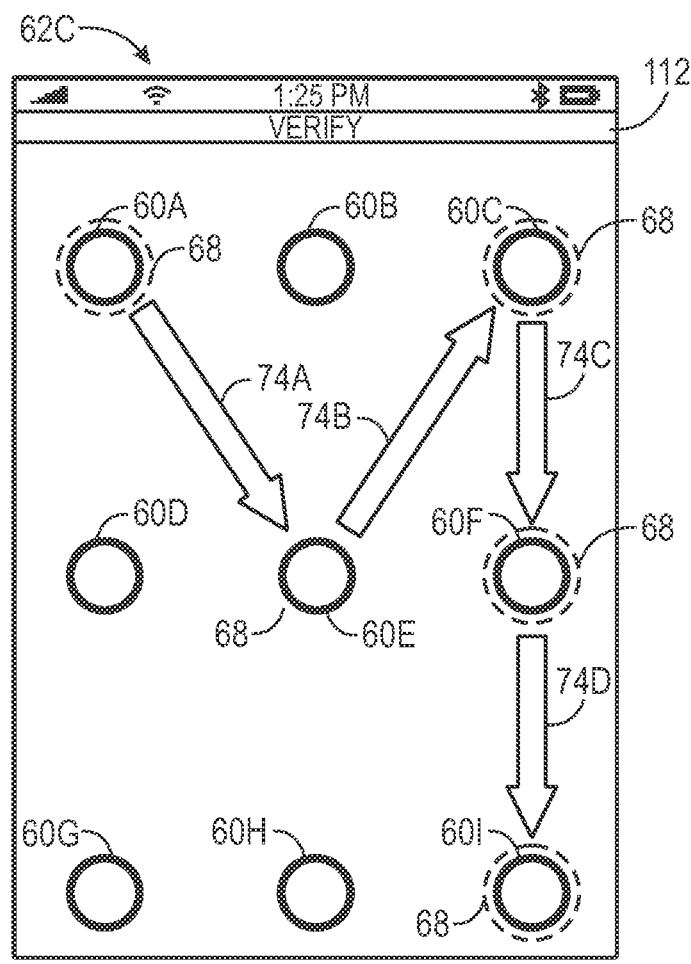

In one embodiment, the finger contact discs 68 of the gesture verification screen 62C may display varying colors based on the correctness of the re-entered gesture as the user, for example, travels from one graphical element 60A-60I to the next. For example, as depicted in FIG. 18, as the user travels (e.g. performs gesture strokes 64) from graphical element 60A to graphical element 60I, if the re-entered gesture is verified as being the initial entered gesture (e.g., entered via gesture entry screen 62A), then the finger contact discs 68 may display color 114A (e.g., green or blue) to indicate correctness of the re-entered gesture. However, if the re-entered gesture is estimated as incorrect or inconsistent with the initially entered gesture (e.g., entered via gesture entry screen 62A), then each contact disc 68 of each graphical element inconsistent with those of the initially entered gesture may display a color 114B (e.g., red or orange) to indicate a discrepancy of the gesture to the user, as shown in FIG. 19. Further, as depicted in FIG. 20, and also noted above with respect to FIG. 8, the gesture verification screen 62C may also include visible traces 74A, 74B, 74C and 74D (e.g., illuminated trails), which may further display varying colors (e.g., red, orange, yellow, blue, green, and so forth) to indicate verification of the gesture re-entered by the user.

In certain embodiments, upon verification, the user may then elect to save (block 100 of FIG. 11) the verified gesture. For example, after the re-entered gesture is verified by the electronic device 10, for example, the user may select the done button 110 via the verification screen 62C to save the just entered, viewed (e.g., repeatedly), and verified gesture to restrict access to confidential data and/or functions that may be stored on the electronic device 10. Accordingly, upon saving the entered and verified gesture, confidential data and/or functions stored on the electronic device can be accessed only if a subsequent entry of a gesture is substantially the same as the saved gesture.

The foregoing demonstrate various ways in which user authentication may be regulated and/or implemented by implementing gesture entry, gesture replay, and gesture verification authentication screens on an electronic device. While certain examples have been provided in the context of a handheld device and tablet computing device, the techniques disclosed herein are equally applicable to any type of electronic device on which access to data or functions (such as applications or network connections) is limited or otherwise regulated. For example, access to confidential information such as phone numbers, personal and professional contacts, electronic communications, information relating to finances or financial accounts, business related projects and documents, personal photos and videos, and so forth may be restricted in view of the present techniques based on user authentication gesture techniques as disclosed herein. Further, the gesture entry, gesture replay, and gesture verification authentication screens may further allow a user added security by including a strength estimation indicator and timer indicator to indicate to the user the strength of the entered gesture before the user saves the gesture.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device, comprising:
a touch sensitive display; and
data processing circuitry configured to:
    cause the touch sensitive display to display a gesture entry screen;
    receive an entered gesture performed on the gesture entry screen, wherein the entered gesture comprises a selection of a set of selectable graphical elements of a plurality of selectable graphical elements displayed on the touch sensitive display and selected along a path in a first order;
    determine a representation of the entered gesture based on the entered gesture;
    cause the touch sensitive display to display a gesture replay screen following the determination of the representation of the entered gesture;
    cause the touch sensitive display to display a replay of the representation of the entered gesture on the gesture replay screen, wherein the replay comprises a sequential illumination of each of the selected set of selectable graphical elements along the path commencing from a first selected selectable graphical element to a last selected selectable graphical element in the representation of the entered gesture such that the complete representation of the entered gesture is replayed, and wherein the sequential illumination illustrates the path of the selected set of selectable graphical elements in the first order;
    cause the touch sensitive display to display a gesture verification screen following one or more replays of the representation of the entered gesture on the gesture replay screen;
    receive a reentered gesture performed on the gesture verification screen;
    indicate a verified gesture if the reentered gesture matches the representation of the entered gesture; and
    save the verified gesture.

2. The electronic device of claim 1, wherein the gesture entry screen comprises a plurality of selectable graphical elements displayed on the touch sensitive display and a plurality of selectable touch-sensing areas not displayed on the touch sensitive display.

3. The electronic device of claim 2, wherein the entered gesture comprises a selection of a combination of selectable graphical elements and selectable touch-sensing areas.

4. The electronic device of claim 1, wherein the data processing circuitry is configured to:
    cause the touch sensitive display to display the replay of the representation of the entered gesture repeatedly;
    receive an input to stop replaying the representation of the entered gesture; and
    end the display of the replay of the representation of the entered gesture once the input to stop replay is received.

5. The electronic device of claim 1, wherein the data processing circuitry is configured to cause the touch sensitive display to display a strength indicator while receiving the entered gesture on the gesture entry screen, wherein the strength indicator indicates an estimated strength of the entered gesture.

6. The electronic device of claim 5, wherein the strength indicator comprises a bar that transitions from empty to full proportional to the estimated strength of the entered gesture.

7. The electronic device of claim 5, wherein the strength indicator comprises a color transition from a first color to a second color, wherein the color transition corresponds to the estimated strength of the entered gesture.

8. The electronic device of claim 5, wherein the data processing circuitry is configured to assign different strength values to different gesture combinations, and wherein the strength indicator indicates the estimated strength based on the different strength values of the entered gesture.

9. The electronic device of claim 1, wherein the data processing circuitry is configured to cause the touch sensitive display to display a timer suitable to indicate a time elapsed while the data processing circuitry is receiving the entered gesture.

10. The electronic device of claim 1, wherein the data processing circuitry is configured to cause the touch sensitive display to display a timer suitable to indicate an elapsed time while the touch sensitive display is displaying a replay of the representation of the entered gesture.

11. The electronic device of claim 1, wherein the data processing circuitry is configured to cause the touch sensitive display to display a timer suitable to indicate an elapsed time while the data processing circuitry is receiving the reentered gesture performed on the gesture screen.

12. The electronic device of claim 1, wherein the data processing circuitry is configured to cause the touch sensitive display to display the sequential illumination of the selected set of selectable graphical elements as fading along the path and corresponding to an estimated position of a user input while the entered gesture is performed on the gesture entry screen.

13. The electronic device of claim 12, wherein the data processing circuitry is configured to cause the touch sensitive display to display an illuminated fading trail originating from a center of the estimated position of the user input, and wherein the illuminated fading trail fades in a manner such that a portion of the illuminated fading trail that is nearest to the estimated position of the user input comprises a greater intensity than a portion of the illuminated trail that is farthest from the estimated position of the user input.

14. The electronic device of claim 13, wherein the illuminated fading trail comprises a variable color that is variable based on an estimated strength of the entered gesture.

15. The electronic device of claim 13, wherein the illuminated fading trail varies in length substantially proportional to a speed of the entered gesture being performed on the gesture entry screen.

16. The electronic device of claim 13, wherein the illuminated fading trail varies in color based on an elapsed time while the data processing circuitry is receiving the entered gesture.

17. A method comprising:
displaying a gesture entry screen on a touch sensitive display;
receiving an entered gesture performed on the gesture entry screen, wherein the entered gesture comprises a selection of a set of selectable graphical elements of a plurality of selectable graphical elements displayed on the touch sensitive display and selected along a path in a first order;
determining a representation of the entered gesture based on the entered gesture received on the gesture entry screen;
displaying a gesture replay screen on the touch sensitive display subsequent to a completion of the performed entered gesture on the gesture entry screen;
replaying the representation of the entered gesture on the gesture replay screen, wherein replaying the representation of the entered gesture comprises sequentially illuminating each of the selected set of selectable graphical elements along the path commencing from a first selected selectable graphical element to a last selected selectable graphical element in the representation of the entered gesture such that the complete representation of the entered gesture is replayed, and wherein sequentially illuminating comprises illustrating the path of the selected set of selectable graphical elements in the first order;
displaying a gesture verification screen on the touch sensitive display succeeding at least one replay of the representation of the entered gesture on the gesture replay screen;
receiving a reentered gesture performed on the gesture verification screen;
indicating a verified gesture if the reentered gesture matches the representation of the entered gesture; and
saving the verified gesture.

18. The method of claim 17, wherein displaying the gesture entry screen comprises displaying a timer indicating an elapsed time while receiving the entered gesture.

19. The method of claim 18, wherein receiving the entered gesture comprises receiving the entered gesture performed on the gesture entry screen during a user-selected time period.

20. The method of claim 17, wherein replaying the representation of the entered gesture on the gesture replay screen comprises displaying a timer indicating an elapsed time of the representation of the entered gesture.

21. The method of claim 20, wherein receiving the reentered gesture performed on the gesture verification screen comprises receiving the reentered gesture performed on the gesture verification screen during a user-selected time period.

22. The method of claim 17, comprising displaying an illuminated fading trail following a user input position while receiving the entered gesture.

23. The method of claim 22, wherein displaying the illuminated fading trail comprises displaying variable colors of the illuminated fading trail based on the entered gesture.

24. The method of claim 23, wherein displaying the variable colors of the illuminated fading trail is based on a estimated strength of the entered gesture, a speed of the entered gesture, an elapsed time while receiving the entered gesture, or combinations thereof.

25. The method of claim 22, wherein displaying the illuminated fading trail comprises varying the length of the illuminated fading trail based on an estimated strength of the entered gesture, a speed of the entered gesture, a time elapsed while receiving the entered gesture, or combinations thereof.

26. The method of claim 17, wherein indicating the verified gesture comprises displaying a gesture verification screen indicating that gestures entered in a gesture authentication screen will be compared with the representation of the entered gesture.

27. A touch sensitive electronic device, comprising:
one or more processors configured to cause a touch sensitive display to present a gesture entry screen, present a gesture replay screen following the presentation of the gesture entry screen, and to present a gesture verification screen following the presentation of the gesture replay screen, and configured to:
receive an entered gesture performed via the gesture entry screen, wherein the entered gesture comprises a selection of a set of selectable graphical elements of a plurality of selectable graphical elements displayed on the touch sensitive display and selected along a path in a first order;
calculate a representation of the entered gesture during the performance of the entered gesture;
instruct the touch sensitive display to iteratively display a performance of the representation of the entered gesture over a period of time via the gesture replay screen and following the performance of the entered gesture, wherein the iteratively displayed performance comprises a sequential illumination of each of the selected set of selectable graphical elements along the path commencing from a first selected selectable graphical element to a last selected selectable graphical element in the representation of the entered gesture such that the complete representation of the entered gesture is replayed, and wherein the sequential illumination illustrates the path of the selected set of selectable graphical elements in the first order;

receive a reentered gesture performed via the gesture verification screen, and indicate a verified gesture if the reentered gesture matches the representation of the entered gesture.

28. The touch sensitive electronic device of claim 27, wherein the one or more processors are configured to indicate an incorrect reentered gesture if the reentered gesture does not match the representation of the entered gesture.

29. The touch sensitive electronic device of claim 28, wherein the one or more processors are configured to cause the touch sensitive display to change a background color on the gesture verification screen to indicate the incorrect reentered gesture.

30. The touch sensitive electronic device of claim 28, wherein the one or more processors are configured to cause the touch sensitive display to change a color of features on the gesture verification screen to indicate the incorrect reentered gesture.

31. The touch sensitive electronic device of claim 27, wherein the touch sensitive electronic display is configured to display multiple cycles of the representation of the entered gesture.

32. The touch sensitive electronic device of claim 27, wherein the touch sensitive electronic display is configured to display one complete cycle of the representation of the entered gesture.

33. The touch sensitive electronic device of claim 27, wherein one or more processors are configured to receive an input via a done replay button of the gesture replay screen once one complete cycle of the representation of the entered gesture is displayed.

* * * * *